(12) United States Patent
Nitta et al.

(10) Patent No.: US 6,519,137 B1
(45) Date of Patent: Feb. 11, 2003

(54) SOLID ELECTROLYTIC CAPACITOR AND PRODUCTION METHOD THEREOF, AND CONDUCTIVE POLYMER POLYMERIZING OXIDIZING AGENT SOLUTION

(75) Inventors: Yukihiro Nitta, Kyoto (JP); Yoshiyuki Mori, Yamaguchi (JP); Munehiro Morokuma, Osaka (JP); Yuki Murata, Yamaguchi (JP); Kazuyo Saito, Osaka (JP); Tsuyoshi Yoshino, Kyoto (JP); Yoshihiro Watanabe, Osaka (JP); Hideki Masumi, Kyoto (JP); Takehiko Nakahara, Kyoto (JP); Ichiro Yamashita, Yamaguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/807,760
(22) PCT Filed: Sep. 8, 2000
(86) PCT No.: PCT/JP00/06123
§ 371 (c)(1),
(2), (4) Date: Jul. 16, 2001
(87) PCT Pub. No.: WO01/20625
PCT Pub. Date: Mar. 22, 2001

(30) Foreign Application Priority Data

| Sep. 10, 1999 | (JP) | 11-257022 |
| Sep. 10, 1999 | (JP) | 11-257023 |
| Sep. 16, 1999 | (JP) | 11-262125 |
| Oct. 4, 1999 | (JP) | 11-282746 |
| Oct. 4, 1999 | (JP) | 11-282747 |
| Oct. 21, 1999 | (JP) | 11-299666 |
| Nov. 4, 1999 | (JP) | 11-313403 |
| Nov. 4, 1999 | (JP) | 11-313423 |
| Jul. 24, 2000 | (JP) | 2000-222303 |
| Jul. 24, 2000 | (JP) | 2000-222304 |

(51) Int. Cl.[7] ............ H01G 9/02; H01G 9/04; H01G 9/00
(52) U.S. Cl. ............ 361/525; 361/530; 29/25.03
(58) Field of Search ............ 361/523–541; 29/25.03

(56) References Cited

U.S. PATENT DOCUMENTS 5,812,367 A * 9/1998 Kudoh et al. ............ 29/25.03

(List continued on next page.)

FOREIGN PATENT DOCUMENTS

JP 61-1146 3/1961

(List continued on next page.)

Primary Examiner—Dean A. Reichard
Assistant Examiner—Eric Thomas
(74) Attorney, Agent, or Firm—McDermott, Will & Emery

(57) ABSTRACT

The present invention relates to a solid electrolytic capacitor having a large capacitance and a higher resistance to heat and adapted as a surface-mount device and a method of producing the same. The invention may include the followings features: (1) a layer containing an electroconductive polymer and a less conductive polymer is provided on a dielectric oxide film on the positive electrode foil; (2) a separator of a polyester resin based unwoven fabric made by span bonding and/or wet processing a resin material is sandwiched between the positive electrode foil and the negative electrode foil and rolled together to form a capacitor element which also include a solid electrolyte; (3) a separator is sandwiched between the positive electrode foil and the negative electrode foil coated with a dielectric oxide film exhibiting a withstand voltage of 0.8 to 10 V and rolled together to form a capacitor element which also include a solid electrolyte of an electrically conductive polymer; (4) the negative electrode foil is coated with a layer made of at least a metallic material selected from titanium, zirconium, hafnium, and its compound or of a carbon material; (5) the capacitor element has its content of, water adjusted to not higher than 1% by weight and is enclosed in an outer case; (6-A) the solid electrolyte is a conductive polymer prepared by chemically polymerizing a heterocyclic monomer with the use of an oxidizing solution of which the weight ratio of bivalent iron to trivalent iron is not higher than 0.02; (6-B) the solid electrolyte is a conductive polymer prepared by chemically polymerizing a heterocyclic monomer with the use of an oxidizing solution of which the molar ratio of aliphatic and/or aromatic sulfonic acid to trivalent iron ranges from 3.0 to 3.5; and (7) the solid electrolyte is a conductive polymer prepared by chemically polymerizing a heterocyclic monomer in which the remaining of a basic organic solvent is not higher than 0.8%.

11 Claims, 1 Drawing Sheet

U.S. PATENT DOCUMENTS 5,914,852 A * 6/1999 Hatanaka et al. ............ 361/523
6,154,358 A * 11/2000 Fukaumi et al. ............. 361/523
6,215,651 B1 * 4/2001 Takada et al. ............... 361/523
6,375,688 B1 * 4/2002 Akami et al. ............... 29/25.03

FOREIGN PATENT DOCUMENTS

| | | |
|---|---|---|
| JP | 60-1826 | 1/1985 |
| JP | 1-304720 | 12/1989 |
| JP | 7-249543 | 9/1995 |
| JP | 8-186062 | 7/1996 |
| JP | 9-186054 | 7/1997 |
| JP | 10-340829 | 12/1998 |

\* cited by examiner

SOLID ELECTROLYTIC CAPACITOR AND PRODUCTION METHOD THEREOF, AND CONDUCTIVE POLYMER POLYMERIZING OXIDIZING AGENT SOLUTION

Solid electrolytic capacitor and production method thereof, and conductive polymer polymerizing oxidizing agent solution.

1. Field of the Invention

The present invention relates to a solid electrolytic capacitor of a wound-roll type having an electrically conductive polymer as the electrolyte and a method of fabricating the same. Also, it relates to an oxidizing agent solution for polymerizing an electrically conductive polymer which is used as the electrolyte in a solid-electrolytic capacitor.

2. Background of the Invention

As a variety of electronic devices are now adapted for operating at higher frequencies, large capacitance type electrolytic capacitors are required which have favorable levels of impedance over the higher frequencies. For diminishing the impedance at higher frequencies, a solid electrolytic capacitor is introduced which employs as the electrolyte a highly electrical conductive material such as a tetracyanoquino-dimethane complex salt (referred to as TCNQ hereinafter) or any other conductive polymer. Also, for satisfying the demand of large capacitance, a wound-roll type of the solid electrolytic capacitor (having a positive foil and a negative foil separated by a separator and wound together in a roll) is proposed which is highly feasible to increase the capacitance as compared with a common electrode foil-layer type capacitor, while employing TCNQ or a conductive polymer as the electrolyte.

For use with such wound-roll type solid electrolytic capacitors, a number of methods for producing a highly conductive polymer have been developed. Among the most common methods for generating a solid electrolyte layer are electrolytic or chemical polymerization of a heterocyclic monomer solution and ah oxidizing agent solution alternately and electrolytic or chemical polymerization of a mixture of oxidizing agent solution and monomer solution for conductive polymer.

Typical examples of the heterocyclic monomer are pyrrole, thiophene, ethylene-dioxythiophene, aniline, and their derivatives. Also, examples of the oxidizing agent solution are alcohol solutions (methanol, ethanol, isopropyl alcohol, n-butanol, and ethylene glycol, etc.) containing p-toluene-sulfonic acid ferric salt, dodecyl-benzene-sulfonic acid ferric salt, naphthalene-sulfonic acid ferric salt, triisopropyl-naphthalene-sulfonic acid ferric salt, and long-chain alphatic sulfonic acid ferric salt. However, successful techniques have hardly been proposed for eliminating the effect of impurities contained in an oxidizing agent solution or a heterocyclic monomer used for chemically polymerizing a conductive polymer. Some conventional methods can simply specify the concentration of an oxidizing agent in an oxidizing agent solution.

It is known to use a separator for avoiding direct contact between the positive electrode foil and the negative electrode foil in a wound-roll type capacitor. The separator in a conventional electrolytic capacitor of a liquid electrolyte type is commonly an electrolyte-filled paper made of Manila hemp or Kraft paper.

In a wound-roll type solid electrolytic capacitor having an electrically conductive polymer as the electrolyte, an electrolyte-filled paper made of glass fiber based unwoven fabric, Manila hemp, or Kraft paper is rolled and then carbonized by baking for use as the separator (referred to as a carbonized paper hereinafter). A particular solid electrolytic capacitor is disclosed in Japanese Patent Laid-open Publication (Heisei)10-340829 where the separator is made of a synthetic unwoven fabric filled with Vinylon (a resin based on polyvinyl alcohol) or a composite unwoven fabric filled with Vinylon as a main component and other resin materials.

Also, uniquely proposed is a method of fabricating a wound-roll type aluminum electrolytic capacitor having TCNQ as the electrolyte which includes heating TCNQ to a temperature higher than its melting point to impregnate a capacitor element with melted TCNQ (comprising substantially 100% of a major component which contributes to the higher electrical conductivity) and then cooling down the capacitor element to yield a solid electrolyte layer of TCNQ between the positive electrode foil and the negative electrode foil. A related technique is provided for applying a dielectric oxide film, 2 to 5 volts, on the negative electrode foil in order to avoid inverse impression of voltage.

On the other hand, some techniques for improving a common aluminum electrolytic capacitor using a liquid electrolyte are disclosed in Japanese Patent Laid-open Publications (Showa)60-1826, (Heisei)1-304720, and (Heisei) 9-186054 where providing a titanium layer or titanium nitride layer on the negative electrode foil made of a conductive metallic material such as aluminum to increase the static capacitance and prevent the electrolyte from being leaked out by the effect of electrochemical reaction over the negative electrode foil.

It is also known that solid electrolytic capacitors having a conductive polymer as the solid electrolyte, unlike common liquid electrolytic capacitors having a liquid electrolyte under an evaporating pressure, never contain a component which can easily evaporated at a higher temperature atmosphere (actually 200° C. or more) during the soldering process for surface mounting electronic devices on a printed circuit board and eliminates substantially an unwanted event of pressure increase in the shell, hence minimizing undesired effects such as expansion of the shell or injury of the sealing members and probably being favorable for use in the surface mounting.

However, such solid electrolytic capacitors having a conductive polymer as the solid electrolyte have been developed much later than popular aluminum electrolytic capacitors having a liquid electrolyte and their techniques for surface mounting fail to be successfully practiced.

One of critical disadvantages of the solid electrolytic capacitors having a highly conductive TCNQ or polymer as the solid electrolyte is that the solid electrolyte has no ionic conductivity hence disabling to repair any damaged portion of the dielectric oxide film, allowing a higher rate of the leakage current, and making frequent occasions of short-circuit during the aging process.

Also, when a glass fiber based unwoven fabric is used as the separator in a wound-roll type capacitor, its rolled form is generally low in the physical strength and its fracture may injure the dielectric oxide film thus causing current leakage or short-circuit particularly during the aging process. The glass fiber unwoven fabric has a disadvantage that its needle-like fiber pieces separated during the cutting or rolling may be scattered in all directions thus damaging the working environment.

The carbonized electrolyte-filled paper assists the TCNQ or conductive polymer to diminish the impedance at high frequencies only when the capacitor element is heated to as a high temperature as over 250° C. The heating up may however injure the dielectric oxide film and increase the leakage current. Also, as the platings (commonly of tin/lead solder) on the leads of the capacitor element are oxidized by the heating, their soldering affinity on the leads of a finished capacitor may significantly be declined. For improvement, the use of silver plated leads which are high in the resistance to oxidation shall be required, resulting in the cost up.

The composite fabric consisting mainly of Vinylon-based unwoven fabric and Vinylon-based resin is lower in the tension strength than the electrolyte-filled paper and may easily be injured during the rolling to form a capacitor element, hence causing short-circuit during the aging process. Also, as an adhesive is used for bonding resin fibers to one another to have a sheet, it may interrupt the application of the conductor polymer to the separator, thus discouraging the fabrication of a solid electrolytic capacitor having a lower impedance at high frequencies. The Vinylon-based resin is low in the resistance to heat and may possibly be decomposed during the use of the solid electrolytic capacitor under a higher temperature condition or during the high-temperature reflow process for soldering. This generates a considerable amount of gas and increases the inner pressure, hence injuring the seals and finally impairing the electric characteristics of the solid electrolytic capacitor.

It is admitted that the solid electrolytic capacitor having TCNQ or conductive polymer as the solid electrolyte, unlike the liquid electrolytic capacitor having a liquid electrolyte (an electrolytic solution), never have any component in its element which may easily be evaporated under a high temperature atmosphere (practically at 200° C. or more) during the soldering for surface mounting electronic devices on a printed circuit board. This will minimize increase of the pressure in the shell and eliminate undesired expansion of the shell or damage to the seal members, permitting the solid electrolytic capacitor to be surface mounted with much ease. It is however found through a series of experiments by us, the inventors, that as the solid electrolyte positively absorbs water in the air, the absorbed water trapped in the capacitor element during the previous step shall be evaporated under the high temperature atmosphere in the surface mounting process and the surface mounting of the solid electrolytic capacitor will be declined in the efficiency as equal to that of the liquid electrolytic capacitor.

More specifically, as the glass fiber unwoven fabric serving as the separator contains highly hydrophilic silica as a main component, it can absorb more water in the air than the resin separator and allows the capacitor element to hold a higher volume of water, thus discouraging the surface mounting process.

The carbonized electrolyte-filled paper is made of a cellulose which also has a higher wetting affinity and can absorb more water in the air than the resin separator. This permits the capacitor element filled with the solid electrolyte to hold a higher volume of water, thus discouraging the surface mounting process.

Meanwhile, the conductive polymer used as the solid electrolyte may be polypyrrole or polyethylene-dioxythiophene prepared by chemically polymerizing ethylene-dioxythiophene with an appropriate oxidizing agent. It is however practically difficult to coat the carbonized paper, glass fiber based fabric, or Vinylon- or polypropylene-based unwoven fabric with the above mentioned conductive polymer. Accordingly, the conductive polymer is likely detached off from the separator by the effect of thermal stress or the like, hence increasing the impedance and declining the capacitance drawing rate. As a result, the overall size per storage capacitance of the solid electrolytic capacitor will be greater than that of any liquid electrolytic capacitor.

The wound-roll type solid electrolytic capacitor is significantly lower in the static capacitance drawing rate on the negative electrode foil than on the positive electrode foil. While the static capacitance drawing rate on the positive electrode foil is sufficient, the overall static capacitance of the wound-roll type electrolytic capacitor is a serial sum of the static capacitance drawn from the positive electrode foil and the static capacitance drawn from the negative electrode foil and will thus be declined to as a small value as 40 to 50%. Accordingly, the overall size per capacitance of the solid electrolytic capacitor will be greater than that of any liquid electrolytic capacitor.

For improvement, a technique is used for impregnating the capacitor element with a polymeric solution which contains a heterocyclic monomer such as ethylene-dioxythiophene, an oxidizing agent such as p-toluene-sulfonic acid ferric salt, and a solvent (water or alcohol such as n-butanol) to develop a large amount of the conductive polymer adjacent to the surfaces of the electrode foils through chemical polymerization. For implementation of the technique, it is desired to have the separator arranged high in the liquid retention and low in the physical density. The lower the density, the higher the occurrence of short-circuit will increase.

When the solid electrolytic capacitor has a rated voltage of higher than 16 V and provided with its separator increased in the density to minimize the short-circuit, its withstand voltage will be improved and simultaneously the bulk density of the separator will increase. This reduces the polymeric solution retained adjacent to the electrode foils and hardly generates a desired amount of the conductive polymer as the solid electrolyte for drawing a given static capacitance.

It is hence understood from the foregoing reasons that the capacitor element of a wound-roll type is hardly impregnated with the conductive polymer uniformly and sufficiently. In particular, the electrical characteristics of polyethylene-dioxythiophene prepared by polymerizing ethylene-dioxythiophene (including the static capacitance determined by the coating adhesivity of the conductive polymer to the dielectric oxide film and the impedance at higher frequencies determined by the filled amount of the conductive polymer) may be varied depending on the property of an oxidizing agent used (more specifically, a difference of the oxidizing agent solution or the heterocyclic monomer between supply lots), the polymerizing conditions, and the time elapsed from the preparation of an oxidizing agent to the polymerization of a material monomer for the conductive polymer.

It is hence an object of the present invention to provide a solid electrolytic capacitor which eliminates the above disadvantages, minimizes the current leakage, and has a large capacitance and a higher resistance to heat to be desirable as a surface-mount electronic device and a method of fabricating the same. It is another object of the present invention to provide an oxidizing agent solution for preparing a conductive polymer to fabricate the above mentioned solid electrolytic capacitor at a higher yielding rate as well as a-higher level of stableness.

DISCLOSURE OF THE INVENTION

The present invention has the following features.

(1) A layer containing an electroconductive polymer and a less conductive polymer is disposed on a dielectric oxide film on the positive electrode made of a valve metal.

(2) A method of producing a solid electrolytic capacitor of a wound-roll type having the above (1) construction comprises-the steps of: immersing a capacitor element fabricated by sandwiching a separator between a positive electrode foil coated with a dielectric oxide film and a negative electrode foil and rolling together into a solution which contains at least an electroconductive polymer and a less conductive polymer (a non-conductive. polymer); heating the capacitor element to evaporate a solvent in the solution and thus develop on the dielectric oxide film on the positive electrode foil a layer containing the electroconductive polymer and the less conductive polymer; and immersing the capacitor element in admixture solution which contains at least an oxidizing solution for polymerizing a conductive polymer and a heterocyclic monomer, or immersing the capacitor element in a solution which contains the oxidizing solution for polymerizing a conductive polymer and then in another solution which contains the heterocyclic monomer, or immersing the capacitor element in a solution which contains the heterocyclic monomer and then in another solution which contains the oxidizing solution for polymerizing a conductive polymer to generate a solid electrolyte made of the conductive polymer between the positive electrode foil and the negative electrode foil.

(3) An unwoven fabric separator made by span bonding and/or wet processing a resin based material is sandwiched between a positive electrode foil coated with a dielectric oxide film and a negative electrode foil and rolled together to form a capacitor element while a solid electrolyte containing the conductive polymer is provided between the positive electrode foil and the negative electrode foil in the capacitor element. Particularly, the separator may be an unwoven fabric based on a polyester resin which is polyethylene-terephthalate or its derivative.

(4) A separator (an unwoven separator based on a resin such as polyethylene-terephthalate) is sandwiched between a positive electrode foil coated with a dielectric oxide film and a negative electrode foil coated with a dielectric oxide film having 0.8 to 10 V of withstand voltage and rolled together to fabricate a capacitor element while a solid electrolyte between the positive and negative electrode foils in the capacitor element is an electrically conductive polymer.

(5) A separator (an unwoven separator based on a resin such as polyethylene-terephthalate) is sandwiched between a positive electrode foil coated with a dielectric oxide film and a negative electrode foil coated with a layer of a metallic material selected from titanium, zirconium, and hafnium or its compound or a carbon material and rolled together to fabricate a capacitor element while a solid electrolyte between the positive and negative electrode foils in the capacitor element is an electrically conductive polymer.

(6) A solid electrolytic capacitor comprises: a capacitor element fabricated by sandwiching and rolling a separator between a positive electrode foil coated with a dielectric oxide film and a negative electrode foil, having a solid electrolyte layer containing a conductive polymer between the positive electrode foil and the negative electrode foil, and arranged to limit the content of water to not higher than 1% by weight based on its weight; an outer case of a bottomed cylindrical shape made of a metallic material in which the capacitor element is enclosed; and a sealant arranged containing a polymer for sealing off the opening of the outer case.

(7) A solid electrolytic capacitor comprises: a capacitor element fabricated by sandwiching and rolling a separator between a positive electrode foil coated with a dielectric oxide film and a negative electrode foil and having a solid electrolyte layer containing a conductive polymer between the positive electrode foil and the negative electrode foil; an outer case of a bottomed cylindrical shape made of a metallic material in which the capacitor element is enclosed; and a sealant made of a peroxide vulcanized and/or resin vulcanized butyl rubber, which has a resiliency of not smaller than 450 $N/cm^2$ at 250° C., for sealing off the opening of the outer case.

(8) Alternatively, an oxidizing solution may be used which has a ferric salt of aliphatic and/or aromatic sulfonic acid dissolved in an alcohol solvent and of which the weight ratio of bivalent iron to trivalent iron is not higher than 0.02.

(9) The solid electrolyte may be a conductive polymer made by chemically polymerizing a heterocyclic monomer with the use of an oxidizing solution which has a ferric salt of aliphatic and/or aromatic sulfonic acid dissolved in an alcohol solvent and of which the molar ratio of the aliphatic and/or aromatic sulfonic acid to trivalent iron ranges from 3.0 to 3.5.

(10) The solid electrolyte may be a conductive polymer made by chemically polymerizing a heterocyclic monomer using an oxidizing solution in which the weight ratio of bivalent iron to trivalent iron is not higher than 0.02 and the molar ratio of aliphatic and/or aromatic sulfonic acid to trivalent iron ranges from 3.0 to 3.5.

(11) The solid electrolyte may be a conductive polymer made by chemically polymerizing a heterocyclic monomer which contains not higher than 0.8% of remaining basic organic solvent as impurities.

(12) A method of producing the solid electrolytic capacitor comprises the steps of: sandwiching and rolling a separator (an unwoven separator based on a resin such as polyethylene-terephthalate) between a positive electrode coated with a dielectric oxide film and a negative electrode of etched aluminum to form a capacitor element; and yielding a solid electrolyte containing a conductive polymer (namely polyethylene-dioxythiophene) between the positive electrode foil and the negative electrode foil with the use of a combination of an oxidizing solution for polymerizing a conductive polymer which has a ferric salt of aliphatic and/or aromatic sulfonic acid (namely p-toluene ferric sulfonate) dissolved in an alcohol solvent and in which the weight ratio of bivalent iron to trivalent iron is not higher than 0.02 and the molar ratio of the aliphatic and/or aromatic sulfonic acid to trivalent iron ranges from 3.0 to 3.5 and a heterocyclic monomer (namely ethylene-dioxythiophene) which contains not higher than 0.8% of remaining basic organic solvent as impurities. Alternatively, this method may be combined with the method depicted in the above paragraph (2).

The solid electrolytic capacitor according to the present invention can hence be minimized in the leakage current and increased in the capacitance while having a higher resistance to heat, being favorable as a surface-mount type device. Also, the oxidizing solution for polymerizing an electrically conductive polymer and the heterocyclic monomer for a conductive polymer according to the present invention can contribute to production of a solid electrolytic capacitor having improved electric characteristics at a higher rate of yield and a higher stability.

PREFERRED EMBODIMENTS

Figure 1:
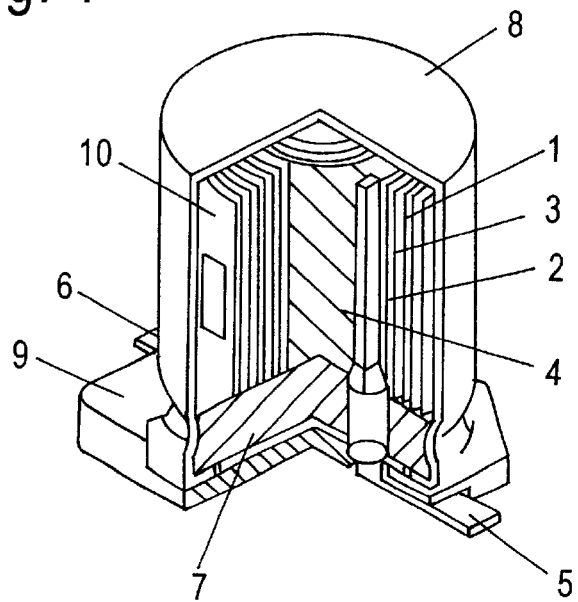
FIG. 1 is a partially cross sectional perspective view of a solid electrolytic capacitor according to the present invention.

As a first embodiment of the present invention, a solid electrolytic capacitor comprises a capacitor element fabricated by sandwiching and rolling a separator between a positive electrode foil coated with a dielectric oxide film and a negative electrode foil, wherein a layer containing an electroconductive polymer and a less conductive polymer is provided at least on the dielectric oxide film on the positive electrode foil, hence allowing the electroconductive polymer which is low in the resistivity to be used as the electrolyte on the dielectric oxide film and thus minimizing the resistivity or the impedance of the capacitor. Also, as the less conductive polymer (if desired, an electrically insulating polymer) which is very high in the resistivity is provided on the dielectric oxide film, it can interrupt an undesired effect of electron avalanche which is derived from injury of the dielectric oxide film and releases a significant amount of leakage current or can at least limit the avalanche to a local region before resulting in breakdown of the dielectric (short-circuit). Accordingly, the electrolytic capacitor is successfully minimized in the occurrence of leakage current and improved for avoiding the generation of short-circuit during the aging process.

The less conductive polymer on the dielectric oxide film assists the draping of the electroconductive polymer over the dielectric oxide film, hence contributing to the higher drawing rate of the solid electrolytic capacitor of a large capacitance type.

As a second embodiment of the present invention, the first embodiment may be modified in which the electroconductive polymer in the layer provided on the dielectric oxide film on the positive electrode foil has a resistivity of not higher than $1.0 \times 10^{10} \Omega/\square$ while the less conductive polymer has a resistivity of higher than $1.0 \times 10^{10} \Omega/\square$. As the electroconductive polymer has a resistivity of not higher than $1.0 \times 10^{10} \Omega/\square$, the impedance characteristics of the capacitor will be improved. Also, as the less conductive polymer has a resistivity of higher than $1.0 \times 10^{10} \Omega/\square$, its insulating property over the dielectric oxide film can limit the effect of electron avalanche to a local region hence permitting the solid electrolytic capacitor to be significantly attenuated in the impedance and the leakage current and substantially prevented from short-circuit during the aging process.

When the resistivity of the electroconductive polymer exceeds $1.0 \times 10^{10} \Omega/\square$, the resistivity of the electrolyte will undesirably be increased thus attenuating the impedance characteristics of the capacitor. Also, when the resistivity of the less conductive polymer is below $1.0 \times 10^{10} \Omega/\square$, the insulating effect on the dielectric film oxide for limiting the electron avalanche to a local region may unfavorably be declined.

As a third embodiment of the present invention, the first or second embodiment may be modified in which the electroconductive polymer in the layer provided on the dielectric oxide film on the positive electrode foil is at least a polymer selected from polypyrrole, polyaniline, polyaniline sulfonate, polythiophene, polyethylene-dioxythiophene, polystyrene sulfonic acid, and their derivatives. As the electroconductive polymer is very high in the conductivity, the conductive polymer layer on the dielectric film oxide of the positive electrode foil can easily be set to a resistivity of not higher than $1.0 \times 10^{10} \Omega/\square$. In addition, the electroconductive polymer is highly compatible with less conductive polymers including glycidyl denatured polyester, sulfonic acid denatured polyester, and carboxylic acid denatured polyester (as will be described with a fourth embodiment) and its combination with the non-electroconductive polymer can improve the adhesion of the conductive polymer to the dielectric oxide film, hence allowing the solid electrolytic capacitor to be minimized in the leakage current, diminished in the occurrence of short-circuit during the aging process, and increased in the drawing rate and the storage capacitance.

As a fourth embodiment of the present invention, the first or second embodiment may be modified in which the less conductive polymer in the layer provided on the dielectric oxide film on the positive electrode foil is at least a polymer or a copolymer selected from polyvinyl-alcohol, polyvinyl-acetate, polycabonate, polyacrylate, polymethacrylate, polystyrene, polyurethane, polyacrylonitrile, polybutadiene, polyisoprene, polyether, polyester, polyethylene-terephthalate, polybutylene-terephthalate, polyamide, polyimide, butyral resin, silicon resin, melamine resin, alkyd resin, cellulose, nitro-cellulose, bisphenol-A epoxy, bisphenol-F epoxy, alicyclic epoxy, and their derivatives.

Accordingly, the polymer or the copolymer is less electrically conductive and its resistivity can thus be set to $1.0 \times 10^{10} \Omega/\square$ or higher enough to form an insulating layer on the dielectric oxide film for limiting the effect of electron avalanche to a local region, permitting the solid electrolytic capacitor to be minimized in the leakage current and attenuated in the occurrence of short-circuit during the aging process.

Nylons are less conductive polymers. However, they are high in the absorption of water and their context of water may unfavorably discourage the advantage of limiting the effect of electron avalanche.

As a fifth embodiment of the present invention, the fourth embodiment may be modified in which the less conductive polymer in the layer provided on the dielectric oxide film on the positive electrode foil is at least a polymer or a copolymer selected from glycidyl denatured polyester, sulfonic acid denatured polyester, and carboxylic acid denatured polyester. As the polymer or the copolymer is less electrically conductive, its resistivity can thus be set to $1.0 \times 10^{10} \Omega/\square$ or higher enough to form an insulating layer on the dielectric oxide film for limiting the effect of electron avalanche to a local region. Also, the denatured substitution can improve the adhesion of the electroconductive polymer to the dielectric oxide film, hence permitting the solid electrolytic capacitor to be minimized in the leakage current, attenuated in the occurrence of short-circuit during the aging process, and increased in the drawing rate and the storage capacitance.

As sixth to eighth embodiments of the present invention, a solid electrolytic capacitor comprises a capacitor element fabricated by sandwiching and rolling an unwoven separator, made by span bonding and/or wet processing a resin based material (namely polyester such as polyethylene-terephthalate), between a positive electrode foil coated with a dielectric oxide film and a negative electrode foil, wherein a solid electrolyte containing an electrically conductive polymer is provided between the positive electrode foil and the negative electrode foil in the capacitor element. As the solid electrolyte of the conductive polymer is made by chemically polymerizing the heterocyclic monomer such as polyethylene-dioxythiophene, its adhesion and bonding strength to the unwoven separator (for example, polyester fabric, nylon fabric, Rayon fabric, trimethylpentene fabric, polyphenylene-sulfide fabric, or celluloid (nitrate cellulose)), hence decreasing the impedance at higher frequencies.

The unwoven fabric made by span bonding, unlike other synthetic resin fabric made by any other technique, can easily be modified to a sheet form by known thermal bonding or mechanical confounding without using any adhesive agent and less susceptible to the failure in chemical polymerization or the peel-off caused by the ingredients of the adhesive agent. This permits the chemically polymerized conductive polymer such as polyethylene-dioxythiophene to be closely attached to the separator, hence contributing to the lower impedance at higher frequencies of the solid electrolytic capacitor.

Moreover, the unwoven fabric made by span bonding is longer in the fiber length and higher in the tension strength than any other unwoven fabrics made by known dry melt-blow techniques. Accordingly, provided that the thickness and the weighting are identical, the occurrence of thread cutout during the rolling process to shape the capacitor element will be less frequent and the short-circuit may favorably be reduced.

The unwoven fabric made by wet processing a polyester resin based material, unlike similar fabrics made by wet processing any other resins, exhibits a higher physical strength of fiber. Accordingly, provided that the thickness and the weighting are identical, the occurrence of thread cutout during the rolling process to shape the capacitor element will be less frequent and the short-circuit may significantly be reduced.

Specific examples of the unwoven fabric made by wet processing a polyester based material are polyethylene-terephthalate resin, polybutylene-terephthalate resin, and a gossamer mixture of polyethylene-terephthalate resin and/or polybutylene-terephthalate resin and at least a cellulose selected from nylon, Rayon, polyethylene, polypropylene, trimethylpentene, polyphenylene-sulfide, and celluloid (nitrate cellulose), and Manila hemp.

The content of polyester resin and its derivative in the unwoven fabric may preferably be not smaller than 50% by weight and more preferably not smaller than 80% by weight. If the content of polyester resin and its derivative in the unwoven fabric is below 50% by weigh, the adhesion and bonding strength of the unwoven fabric to the solid electrolyte may be declined thus hardly maintaining the impedance to an acceptable lower level at higher frequencies. Above all, the polyethylene-terephthalate has compatibility parameters which are very closely approximate to those of polyethylene-dioxythiophene of the solid electrolyte and its adhesion and bonding strength to the solid electrolyte can be higher than any other synthetic resin materials, hence successfully declining the impedance at higher frequencies.

As a ninth embodiment of the present invention, the sixth embodiment may be modified in which the unwoven separator has a thickness of not greater than 80 μm and a weighting of 10 to 60 g/m². This provides a higher tension strength enough to prevent an event of thread cutout in the separator during the rolling process of the capacitor element, allowing the capacitor element to have a large capacitance per unit volume when its diameter is small and also the resistance between the two electrode foils to be minimized. Accordingly, the solid electrolytic capacitor can be decreased in the impedance at higher frequencies.

When the weighing of the separator is not higher than 10 g/m², the thread cutout in the separator may unfavorably increase. When the weighing exceeds 60 g/m², the impedance at higher frequencies may undesirably increase.

As a tenth embodiment of the present invention, a solid electrolytic capacitor comprises a capacitor element fabricated by sandwiching and rolling a separator between a positive electrode foil coated with a dielectric oxide film and a negative electrode foil coated with a dielectric oxide film having 0.8 to 10 V of withstand voltage, wherein a solid electrolyte containing an electrically conductive polymer is provided between the positive electrode foil and the negative electrode foil in the capacitor element. This improves the wetting characteristics of the dielectric oxide film on the negative electrode foil to the polymerizing solution (more specifically, a solution containing a large amount of solvent such as water or alcohol having a property of bonding with hydrogen). Accordingly, if the amount of the polymerizing solution adjacent to the negative electrode foil is equal to that of a prior art, the adhesion of the solid electrolyte of the generated conductive polymer to the negative electrode foil can significantly be increased, hence improving the static capacitance drawing rate. As a result, a sum series capacitance including the static capacitance drawn from the positive electrode will be increased contributing to the large capacitance of the solid electrolytic capacitor.

When the withstand voltage across the negative electrode foil exceeds 10 V, the actual storage capacitance per unit volume of the negative electrode foil (a static capacitance of the foil measured within the solution) may be declined hence discouraging the capacitor for a large capacitance. Also, when the withstand voltage is 0.8 V or smaller, the oxide film may hardly be deposited to a uniform thickness hence declining the wetting characteristics to the polymerizing solution and failing to improve the static capacitance drawing rate. Therefore, the-withstand voltage on the oxide film of the negative electrode foil ranges preferably from 0.8 V to 10 V and more preferably from 1.0 V to 5 V.

While the negative electrode foil of a conventional aluminum electrolytic capacitor exhibits a withstand voltage of 0.2 V to 0.5 V, its thermal oxide film or natural oxide film is not uniform and contains a hydrate. Hence, it is different from that of the present invention.

The dielectric oxide film according to the present invention may preferably be deposited by anode oxidization. The dielectric oxide film made by the anode oxidization is tight and uniform in texture, hence improving the wetting characteristics of the negative electrode foil and increasing the static capacitance drawing rate. Also, this attenuates the inner resistance at the negative electrode foil boundary thus decreasing the impedance at higher frequencies.

As an eleventh embodiment of the present invention, a solid electrolytic capacitor comprises a capacitor element fabricated by sandwiching and rolling a separator between a positive electrode foil coated with a dielectric oxide film and a negative electrode foil coated with a layer made of at least a metallic material selected from titanium, zirconium, and hafnium or its compound or a carbon based material, wherein a solid electrolyte containing an electrically conductive polymer is provided between the positive electrode foil and the negative electrode foil in the capacitor element. This improves the wetting characteristics of the layer on the negative electrode foil to the polymerizing solution (more particularly, a solution containing a large amount of solvent such as water or alcohol having a property of bonding with hydrogen). Also, the amount of the polymerizing solution impregnating the separator is greater than that of any other separator. Accordingly, if the amount of the polymerizing solution adjacent to the negative electrode foil is equal to that of a prior art, the adhesion of the solid electrolyte of the generated conductive polymer to the negative electrode foil can significantly be increased, hence improving the static capacitance drawing rate. As a result, a sum series capacitance including the static capacitance drawn from the positive electrode will be increased contributing to the large capacitance of the solid electrolytic capacitor.

Particular examples of the compound of titanium, zirconium, or hafnium include its oxides, carbides, and nitrides. The carbon material may be selected from carbon, graphite, and grassy carbon.

As a twelfth embodiment of the present invention, the tenth or eleventh embodiment may be modified in which the separator is an unwoven fabric of which the density is varied along the thickness and which is rolled with its lower density side facing the negative electrode foil. This allows the polymerizing solution to stay adjacent to (the lower density side of) the negative electrode foil with an amount enough to form the solid electrolyte of the conductive polymer essential for drawing a static capacitance from the negative electrode foil. Simultaneously, there is developed a distance (at the lower density side of the separator) between the two electrodes for-avoiding sparking at the positive electrode which may cause a short-circuit. Accordingly, with its large capacitance, the solid electrolytic capacitor will hardly permit short-circuits during the aging process.

The process of varying the density of the separator along the thickness may be carried out preferably by coupling two different density unwoven fabrics to each other by thermal bonding, press bonding, or a combination of thermal and press bonding actions or by depositing on the surface of an unwoven fabric substrate a resin fabric which is softened or semi-melted and laid so that its density is varied along the thickness.

A method of bonding two separators with an adhesive is not recommended as it may decline the impedance characteristics of a finished capacitor.

As a thirteenth embodiment of the present invention, a solid electrolytic capacitor comprises: a capacitor element fabricated by sandwiching and rolling a separator between a positive electrode foil coated with a dielectric oxide film and a negative electrode foil, having a solid electrolyte layer containing a conductive polymer between the positive electrode foil and the negative electrode foil, and arranged to limit the content of water to not higher than 1% by weight based on its weight; an outer case of a bottomed cylindrical shape made of a metallic material in which the capacitor element is enclosed; and a sealant arranged containing a polymer for sealing off the opening of the outer case. This allows the capacitor element having a roll of the solid electrolyte to be enclosed in the outer metallic case of which the opening is tightly sealed off. In the outer case (where the wound-roll capacitor element is enclosed), water contained in the capacitor element (more particularly, the water absorbable separator containing a more amount of water than the solid electrolyte) is likely evaporated and may increase the inner pressure in the sealed case. For eliminating the increase of the inner pressure, the content of water in the capacitor element is controlled as described above. Accordingly, when exposed to high temperature conditions during the surface mounting process, the outer case will be prevented from increasing the inner pressure to permit a stable action of the surface mounting process.

As the outer metallic case made of aluminum or aluminum alloy exhibits less plastic deformation when the inner pressure increases, it may hardly be deformed in higher temperature conditions during the surface mounting process due to the help of the above mentioned advantage, permitting a more stable action of the surface mounting process.

Furthermore, as the opening of the outer metallic case is sealed off by means of a curling technique, the sealant made of a resilient polymer is used. Accordingly, deformation at the opening side of the case can successfully be eliminated even when the surface mounting process is carried out under higher temperature conditions.

As a fourteenth embodiment of the present invention, a solid electrolytic capacitor comprises: a capacitor element fabricated by sandwiching and rolling a separator between a positive electrode foil coated with a dielectric oxide film and a negative electrode foil and having a solid electrolyte layer containing a conductive polymer between the positive electrode foil and the negative electrode foil; an outer case of a bottomed cylindrical shape made of a metallic material in which the capacitor element is enclosed; and a sealant made of a peroxide vulcanized and/or resin vulcanized butyl rubber, which has a resiliency of not smaller than 450 N/cm² at 250° C., for sealing off the opening of the outer case. As the peroxide vulcanized and/or resin vulcanized butyl rubber has a higher resistance to heat, it can prevent degradation of the sealing effect when an abrupt thermal stress is applied during the surface mounting process. Also, it favorably protects the solid electrolyte in the solid electrolytic capacitor from being degraded with time by the action of water sneaked in, hence contributing to the higher reliability of the-solid electrolytic capacitor.

Also, while the temperature during the surface mounting process for the solid electrolytic capacitor is commonly 200 to 250° C., the resiliency of the rubber sealant of the solid electrolytic capacitor is 450 N/cm² at substantially 250° C. and can maintain the mechanical strength with the outer case increased in the inner pressure due to the evaporation of water contained in the capacitor element. Accordingly, the deformation caused by the increase of the inner pressure will be minimized and the shape and the surface-mount characteristics of the solid electrolytic capacitor will hardly be impaired during the surface mounting process.

As a fifteenth embodiment of the present invention, the thirteenth embodiment may be modified in which the sealant containing a polymer is a peroxide vulcanized and/or resin vulcanized butyl rubber which has a resiliency of not smaller than 450 N/cm² at 250° C. and its advantage can thus be identical to that of the fourteenth embodiment.

As a sixteenth embodiment of the present invention, a solid electrolytic capacitor comprises a solid electrolyte made of an electrically conductive polymer prepared by chemical polymerizing a heterocyclic monomer with the use of an oxidizing solution which has a ferric salt of aliphatic and/or aromatic sulfonic acid dissolved in an alcohol solvent and of which the weight ratio of bivalent iron to trivalent iron is not higher than 0.02. This allows the highly conductive polymer to be yielded at a higher efficiency.

For stably having a lower level of the impedance, the weight ratio of bivalent iron to trivalent iron is preferably not higher than 0.01.

As a seventeenth embodiment of the present invention, a solid electrolytic capacitor comprises a solid electrolyte made of an electrically conductive polymer prepared by chemical polymerizing a heterocyclic monomer with the use of an oxidizing solution which has a ferric salt of aliphatic and/or aromatic sulfonic acid dissolved in an alcohol solvent and of which the molar ratio of the aliphatic and/or aromatic sulfonic acid to trivalent iron ranges from 3.0 to 3.5. This allows the highly conductive polymer to be yielded at a higher efficiency and minimizes injury of the dielectric oxide film caused by free sulfonic acid, hence diminishing the leakage current.

When the molar ratio of the aliphatic and/or aromatic sulfonic acid to trivalent iron is smaller than 3.0, the amount of sulfonic acid acing as the dopant is decreased thus declining the conductivity of the conductive polymer and damaging the impedance characteristics.

When the molar ratio of the aliphatic and/or aromatic sulfonic acid to trivalent iron exceeds 3.5, an excess of the sulfonic acid excluding the proper amount used as the dopant may turn to chemically active free sulfonic acid which undesirably injures the dielectric-oxide film and increases the leakage current.

This disadvantage may result from the following event. We, the inventors, found from a series of analyzing actions (qualitative and quantitative analysis of trivalent and bivalent iron) that trivalent iron shifted to bivalent iron in the oxidizing solution (particularly a hydroxy alcohol solution). It was proved that the presence of bivalent iron critically affected the chemical polymerization of a conductive polymer. The p-toluene ferric sulfonate alcohol solution contained an unnegligible amount of bivalent iron. In practice, when the period after preparation of the oxidizing solution was extended or the temperature of the oxidizing solution or in its storage period was relatively high, the amount of bivalent iron was significantly increased thus declining the polymerizing action for yielding the conductive polymer.

It is assumed that the chemical polymerization of the heterocyclic monomer shifts trivalent iron in the oxidizing agent to bivalent iron and if the oxidizing solution contains bivalent iron as impurities, the speed of reducing trivalent iron is declined thus to interrupt the chemical polymerization of the heterocyclic monomer and attenuate the yield of the polymer.

We, the inventors, also found through a series of analyzing actions (quantitative analysis of trivalent iron and sulfonic acid such as p-toluene-sulfonic acid) that when sulfonic acid acting as the dopant was smaller in the amount than trivalent iron in the oxidizing solution (particularly a hydroxy alcohol solution), the oxidation of trivalent iron prevented the dosage from reaching a desired level for chemically polymerizing the heterocyclic monomer and thus assisted to yield the less conductive polymer at higher priority while not declining the rate of yield.

According to the present invention, during the polymerization with the oxidizing solution, (A) the ratio of bivalent iron to trivalent iron and (B) the molar ratio of aliphatic and/or aromatic sulfonic acid to trivalent iron are appropriately controlled to minimize change in the static capacitance and the impedance.

As an eighteenth embodiment of the present invention, the sixteenth or seventeenth embodiment may be modified in which the oxidizing solution is an alcohol solution containing a ferric salt of p-toluene-sulfonic acid.

As a nineteenth embodiment of the present invention, an oxidizing solution for producing an electrically conductive polymer, has a ferric salt of aliphatic and/or aromatic sulfonic acid dissolved in an alcohol solvent, wherein the weight ratio of bivalent iron to trivalent iron is not higher than 0.02 and the molar ratio of the aliphatic and/or aromatic sulfonic acid to trivalent iron ranges from 3.0 to 3.5. This ensures the production of the solid electrolytic capacitor of the sixteenth or seventeenth embodiment.

As a twentieth embodiment of the present invention, a solid electrolytic capacitor comprises a solid electrolyte made of an electrically conductive polymer prepared by chemical polymerizing a heterocyclic monomer which contains an impurity of remaining basic organic solvent consisting mainly of not higher than 0.8% of N,N-dimethyl-acetoamide. As the remaining basic organic solvent is limited to not higher than 0.8%, the conductive polymer can be yielded at a higher efficiency.

For stably having a lower level of the impedance, the remaining basic organic solvent in the heterocyclic monomer is preferably not higher than 0.6%.

As a twenty first embodiment of the present invention, the twentieth embodiment may be modified in which the conductive polymer of the solid electrolyte is prepared by chemically polymerizing ethylene-dioxythiophene as the heterocyclic monomer in combination with an oxidizing agent and a dopant. As the amount of N,N-dimethyl-acetoamide (an impurity) used as a reaction agent during the polymerization for ethylene-dioxythiophene is properly controlled, the conductive polymer can be yielded at a higher efficiency from the chemical polymerization.

This advantage may be explained by the following reason. In common, when a heterocyclic monomer is chemically polymerized to yield a conductive polymer for a solid electrolytic capacitor at a higher efficiency, its polymerization is carried out under an acidic condition.

If the polymerizing process is shifted to a basic condition, the yield and the conductivity of the conductive polymer both will be declined. The polymerization may be maintained to an acidic condition by adding a polymerizing solution (for example, a mixture of the heterocyclic monomer, the oxidizing agent, the dopant, and the polymerizing agent) with desired non-organic acids and organic acids. However, some types of acid may cause competitive reactions against the existing acids and dopants provided for yielding the conductive polymer, hence resulting in polymerizing failure (more particularly, declination of the rate of yield and the conductivity of a finished conductive polymer). It is thus known that the polymerizing agent added to the polymerizing solution is preferably water or alcohols (methanol, ethanol, isopropyl alcohol, n-propanol, n-butanol, ethylene glycol, etc.).

In the embodiments, the heterocyclic monomer of ethylene-dioxythiophene is chemically polymerized using, for example, n-butanol or ethylene glycol.

We, the inventors, found through a series of analyzing actions (gas chromatogram-mass analysis) that a basic impurity was contained in ethylene-dioxythiophene as the heterocyclic monomer and successfully identified as N,N-dimethyl-acetoamide.

N,N-dimethyl-acetoamide is a reaction agent used for polymerizing ethylene-dioxythiophene and may be left as a basic compound in the ethylene-dioxythiophene. It is also found that the chemical polymerization for yielding the conductive polymer is unnegligibly affected by the remaining of N,N-dimethyl-acetoamide.

According to the present invention, the remaining of a basic organic substance can properly be controlled thus to minimize change in the static capacitance and the impedance of the solid electrolytic capacitor.

As a twenty second embodiment of the present invention, a method of producing a solid electrolytic capacitor comprises the steps of: sandwiching a separator between a positive electrode foil coated with a dielectric oxide film and a negative electrode foil and rolling together to form a capacitor element; and immersing the capacitor element in a mixture solution which contains the oxidizing solution for polymerizing a conductive polymer of the nineteenth embodiment and the heterocyclic monomer of the twentieth or twenty first embodiment, or immersing the capacitor element in a solution which contains the oxidizing solution for polymerizing a conductive polymer of the nineteenth embodiment and then in another solution which contains the heterocyclic monomer of the twentieth or twenty first embodiment, or immersing the capacitor element in a solution which contains the heterocyclic monomer of the twentieth or twenty first embodiment and then in another solution which contains the oxidizing solution for polymerizing a conductive polymer of the nineteenth embodiment to generate a solid electrolyte made of the conductive polymer between the positive electrode foil and the negative electrode foil.

According to the method and the oxidizing solution, the solid electrolytic capacitor minimized in the change of the static capacitance and the impedance can stably be fabricated.

As a twenty third embodiment of the present invention, a method of producing a solid electrolytic capacitor comprises the steps of: immersing a capacitor element fabricated by sandwiching a separator between a positive electrode foil coated with a dielectric oxide film and a negative electrode foil and rolling together into a solution which contains at least the electroconductive polymer of the third embodiment and the less conductive polymer of the fourth or fifth embodiment; heating the capacitor element to evaporate a solvent in the solution and thus develop on the dielectric oxide film on the positive electrode foil a layer containing the electroconductive polymer and the less conductive polymer; and immersing the capacitor element in a mixture solution which contains at least an oxidizing solution for polymerizing a conductive polymer and a heterocyclic monomer, or immersing the capacitor element in a solution which contains the oxidizing solution for polymerizing a conductive polymer and then in another solution which contains the heterocyclic monomer, or immersing the capacitor element in a solution which contains the heterocyclic monomer and then in another solution which contains the oxidizing solution for polymerizing a conductive polymer to generate a solid electrolyte made of the conductive polymer between the positive electrode foil and the negative electrode foil. According to the method, the solid electrolytic capacitor of a large capacitance type favorably attenuated in the leakage current can stably be fabricated.

As a twenty fourth embodiment of the present invention, the twenty third embodiment may be modified in which the solution which contains the conductive polymer and the less conductive polymer also contains at least a water solvent. This allows the water in the solution to assist the deposition of the layer containing the electroconductive polymer and the less conductive polymer more intensively in distribution on the dielectric oxide film than on the separator which is made of a synthetic resin (polyethylene-terephthalate) and thus is hydrophobic (as most synthetic resins are hydrophobic). Accordingly, the covering of the dielectric oxide film with the electroconductive polymer and the less conductive polymer can be improved thus to increase the drawing rate of static capacitance from the dielectric oxide film, hence contributing to the large capacitance of the solid electrolytic capacitor.

The content of water in the solution which contains the electroconductive polymer and the less conductive polymer may preferably be not smaller than 1% by weight and more preferably not smaller than 10% by weight.

When the content of water is smaller than 1% by weight, the intensive distribution will hardly be implemented.

As a twenty fifth embodiment of the present invention, the twenty third or fourth embodiment may be modified in which the oxidizing solution for polymerizing a conductive polymer which is used for forming the solid electrolyte made of the conductive polymer is equal to the oxidizing solution for polymerizing a conductive polymer of nineteenth embodiment while the heterocyclic monomer is equal to the heterocyclic monomer of the twentieth or twenty first embodiment. This allows the advantage of the twenty third or fourth embodiment to be desirably combined with the advantage of the twenty second embodiment.

The embodiments of the present invention will be described referring to the accompanying drawings.

Figure 2:
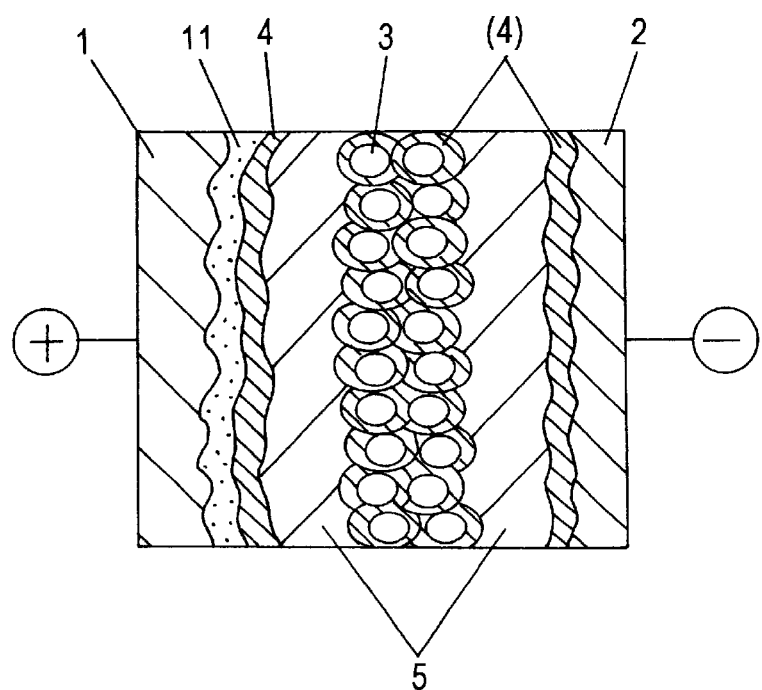
FIG. 2 is a schematic view showing an enlarged primary portion of the capacitor element.

FIGS. 1 and 2 are a partially cross sectional perspective view of the solid electrolytic capacitor of the present invention and an enlarged view showing a primary part of the capacitor. As illustrated, a separator 3 is sandwiched between a positive electrode foil 1 made of an aluminum foil as an anode and coated with a dielectric oxide film 11 by oxidation after etched to rough the surface and a negative electrode foil 2 made of an etched aluminum foil as a cathode and rolled together to form a capacitor element 12. A layer 4 containing an electroconductive polymer and a less conductive polymer is deposited on the dielectric oxide film 11. The capacitor element 12 has a layer 5 of a chemically polymerized electroconductive polymer (directly adjacent to the layer 4 containing the electroconductive polymer and the less conductive polymer) provided between the positive electrode foil 1 and the negative electrode foil 2.

Also, another dielectric oxide film exhibiting a withstand voltage of 0.8 to 10 V (not shown) may be provided on the negative electrode foil 2. The negative electrode foil 2 may be coated with a layer (not shown) made of at least a metallic material selected from titanium, zirconium, hafnium, and their compound or a carbon material.

The separator 3 may preferably be made of a polyester resin based fabric such as polyethylene-terephthalate or of an unwoven fabric which is substantially uniform in the density along the thickness or is varied in the density along the thickness. When the separator is varied in the density along the thickness, its lower density side faces directly the negative electrode foil.

The capacitor element 12 is enclosed in a bottomed cylindrical alumininum case 9 of which the opening is sealed off with a rubber sealant 8 across which mounted are a positive electrode lead 6 and a negative electrode lead 7 extending from the positive electrode foil 1 and the negative electrode foil 2 respectively. The positive electrode lead 6 and the negative electrode lead 7 extend through a base strip 10 and bent flat at least with their outermost ends, thus constituting the solid electrolytic capacitor of a surface mount type.

The layer 4 containing the electroconductive polymer and the less conductive polymer is disposed at least on the dielectric oxide film 11 and may simultaneously be located directly on the negative electrode foil 2 or the separator 3.

While the followings are some practical examples of the embodiments of the present invention, the present invention is not limited to the examples. The expression "parts" described below stands for parts by weight.

Examples of the first to fifth embodiments and the twenty third to twenty fifth embodiments are now explained.

EXAMPLE 1

An unwoven fabric separator (50 $\mu$m in thickness and 25 g/m$^2$ in weighing) made by span bonding a polyethylene-terephthalate resin was sandwiched between a positive electrode foil and a negative electrode foil and rolled together to form a wound-roll type capacitor element (of which the static capacitance was 670 µF at a frequency of 120 Hz when impregnated with an ethylene glycol solution containing 10% by weight of ammonium adipate).

The capacitor element was then immersed in a water solution (having 4.0% by weight of total solids and referred to as a substrate solution A hereinafter) containing 1.0% by weight of polyethylene-dioxythiophene-polystyrene-sulfonic acid (a highly conductive electroconductive polymer) and 3.0% by weight of glycidyldenatured polyester (a less conductive polymer) and dried at 150° C. for five minutes to yield a layer containing the highly conductive electroconductive polymer of polyethylene-dioxythiophene-polystyrene-sulfonic acid and the less conductive polymer of glycidyl denatured polyester.

Meanwhile, the resistivity measured across a 10 µm thick layer of the polyethylene-dioxythiophene-polystyrene-sulfonic acid deposited on a glass plate was $1.0 \times 10^{4-5} \Omega/\square$.

The resistivity measured across a 10 µm thick layer of the glycidyl denatured polyester deposited on a glass plate was as high as exceeding $1.0 \times 10^{10} \Omega/\square$ of the measuring limit of a resistivity meter.

Then, the capacitor element was immersed in a solution (referred to as a polymeric solution A herein after) containing one part of ethylene-dioxythiophene as a heterocyclic monomer, two parts of p-toluene-sulfonic acid ferric salt, and four parts of n-butanol as a polymerizing agent and, after taken out, left intact at 85° C. for 60 minutes to yield a chemically polymerized highly electroconductive polymer of polyethylene-dioxythiophene between the two electrode foils.

The capacitor element was then rinsed, dried, and enclosed in an aluminum case together with a resin vulcanized butyl rubber sealant (comprising 30 parts of butyl polymer, 20 parts of carbon, and 50 parts of inorganic filler and having a hardness of 70 IRHD (the international unit of rubber hardness). After the opening of the case was sealed off by curling, both leads extending from the positive and negative electrode foils were joined to a base strip made of polyphenylene sulfide and bent flat to complete a surface-mount type solid electrolytic capacitor (measured 10 mm in diameter and 10 mm in height).

EXAMPLE 2

The polymeric solution A of Example 1 was replaced by a combination of one part of ethylene-dioxythiophene as the heterocyclic monomer, a mixture of one part of naphthalene-sulfonic acid ferric salt and one part of tri-isopropyl-naphthalene as the oxidizing agent, and four parts of ethanol as the polymerizing agent.

Also, except that the unwoven fabric separator of span-bonded polyethylene-terephthalate was replaced by an unwoven fabric separator (50 µm in thickness and 22.5 g/m² in weighing) made by wet processing a polyethylene-terephthalate resin, the same manner as of Example 1 was used to fabricate Example 2.

EXAMPLE 3

Except that the polymeric solution A of Example 1 was replaced by a mixture solution containing one part of pyrrole as the heterocyclic monomer, two parts of ammonium persulfate as the oxidizing agent, and a mixture of one part of methanol and three parts of water as the polymerizing agent, the same manner as of Example 1 was used to fabricate Example 3.

EXAMPLE 4

Except that the separator of Example 1 was replaced by another separator (50 µm in thickness and 22.5 g/m² in weighing) made by wet processing a polybutylene-terephthalate resin, the same manner as of Example 1 was used to fabricate Example 4.

EXAMPLE 5

Except that the separator of Example 1 was replaced by a glass fiber based unwoven fabric (80 µm in thickness and 10 g/m² in weighing), the same manner as of Example 1 was used to fabricate Example 5.

EXAMPLE 6

Except that a sheet of electrolyte paper (50 µm in thickness) made of Manila hemp was sandwiched between a positive electrode foil and a negative electrode foil, wound to a roll, and heated at 275° C. under a nitrogen atmosphere for two hours to yield a capacitor element with the electrolyte paper carbonized between the two electrodes, the same manner as of Example 1 was used to fabricate Example 6.

EXAMPLE 7

Except that the substrate solution A of Example 1 was replaced by a water solution (4.0% by weight of total solids) containing 1.0% by weight of sulfonic polyaniline as the electroconductive polymer and 3.0% by weight of glycidyl denatured polyester, the same manner as of Example 1 was used to fabricate Example 7.

The resistivity measured across a 10-µm thick layer of the sulfonic polyaniline deposited on a glass plate was $1.0 \times 10^{8-9} \Omega/\square$.

EXAMPLE 8

Except that the substrate solution A was replaced by a water solution (4.0% by weight of total solids) containing 1.0% by weight of polyethylene-dioxythiophene-polystyrene-sulfonic acid, 1.5% by weight of sulfonic acid denatured polyester as the less conductive polymer, and 1.5% by weight of carboxylic acid denatured polyester as the less conductive polymer, the same manner as of Example 1 was used to fabricate Example 8.

The resistivity measured across a 10-µm thick layer of the sulfonic acid denatured polyester deposited on a glass plate was as high as exceeding $1.0 \times 10^{10} \Omega/\square$ of the measuring limit of the resistivity meter. Similarly, the resistivity measured across a 10-µm thick layer of the carboxylic acid denatured polyester deposited on a glass plate was as high as exceeding $1.0 \times 10^{10} \Omega/\square$ of the measuring limit of the resistivity meter.

EXAMPLE 9

Except that the polymeric solution A of Example 1 was replaced by a solution containing one part of ethylene-dioxythiophene as the heterocyclic monomer, two parts of p-toluene-sulfonic acid ferric salt as the oxidizing agent, four parts of n-butanol as the polymerizing agent, and 0.5 part of glycidyl denatured polyester as the less conductive polymer (identical to that in the substrate solution A), the same manner as of Example 1 was used to fabricate Example 9.

Comparison 1

Except that the substrate solution A of Example 1 was replaced by a water solution containing 4.0% by weight of polyethylene-dioxythiophene-polystyrene-sulfonic acid as the electroconductive polymer, the same manner as of Example 1 was used to fabricate Comparison 1.

Comparison 2

Except that the substrate solution A of Example 1 was replaced by a water solution containing 4.0% by weight of glycidyl denatured polyester as the less conductive polymer, the same manner as of Example 1 was used to fabricate Comparison 2.

The solid electrolytic capacitors of Examples 1 to 9 of the present invention and Comparisons 1 and 2 are listed in Table 1 with their measurements of the static capacitance (at 120 Hz of measuring frequency), the impedance (at 100 Hz of measuring frequency), the leakage current (2 minutes after the application of 6.3 V of rated voltage), and the number of short-circuits (fault actions) during the aging process.

The number of test pieces in each case is 50. The static capacitance, the impedance, and the leakage current are the average values of particular samples which generated no short-circuit.

TABLE 1

| | Static capacitance ($\mu$F, 120 Hz) | Impedance (m$\Omega$, 100 kHz) | Leakage current ($\mu$A, 2 min) | Number of short-circuits |
|---|---|---|---|---|
| Example 1 | 603 | 9 | 38 | 0 |
| Example 2 | 600 | 10 | 37 | 0 |
| Example 3 | 601 | 11 | 30 | 0 |
| Example 4 | 590 | 10 | 36 | 0 |
| Example 5 | 591 | 10 | 34 | 0 |
| Example 6 | 600 | 10 | 32 | 0 |
| Example 7 | 602 | 10 | 38 | 0 |
| Example 8 | 602 | 10 | 37 | 0 |
| Example 9 | 630 | 9 | 34 | 0 |
| Comparison 1 | 495 | 29 | 350 | 11 |
| Comparison 2 | 298 | 122 | 20 | 0 |

As apparent from Table 1, the solid electrolytic capacitors of Examples 1 to 9, each having layers of the electroconductive polymer and the less conductor polymer deposited on the dielectric oxide film of the positive electrode of a valve metal, allow the electroconductive polymer, which is deposited on the dielectric oxide film and has a lower resistivity, to serve as the electrolyte and can successfully decline the impedance (the resistivity).

Also, as the less conductive polymer exhibiting a higher resistivity is provided on the dielectric oxide film, it can interrupt an effect of electron avalanche which is derived from injury of the dielectric oxide film and releases a significant amount of leakage current or can at least limit the avalanche to a local region before resulting in breakdown of the dielectric (short-circuit). Accordingly, the solid electrolytic capacitors of Examples 1 to 9 is successfully minimized in the occurrence of leakage current and improved for avoiding the generation of short-circuit during the aging process, as compared with the solid electrolytic capacitors of Comparison 1.

Furthermore, as the less conductive polymer provided on the dielectric oxide film is glycidyl denatured polyester or the like, it enhances the coverage of the electroconductive polymer over the dielectric oxide film and can contributes to the implementation of the higher static capacitance of the solid electrolytic capacitor as compared with Comparison 1.

On the other hand, the solid electrolytic capacitor of Comparison 2 has a less conductive polymer, which is high in the resistivity, provided on the dielectric oxide film and can thus exhibit a higher impedance than that of any of Examples 1 to 9 of the present invention, which has the electroconductive polymer and the less conductive polymer provided in a combination, although significantly declines the effect of electron avalanche and develops almost no short-circuits, and can unfavorably be low in the drawing rate on the dielectric oxide film, thus ensuring little static capacitance.

Characteristic examples of the sixth to ninth embodiments are now explained.

EXAMPLE 10

An unwoven fabric separator (45 $\mu$m in thickness and 25 g/m$^2$ in weighing) made by span bonding a polyethylene terephthalate resin was sandwiched between a positive electrode foil of aluminum coated with a dielectric oxide film by carrying out an anode oxidizing process after an etching process for developing a rough surface and a negative electrode of etched aluminum and rolled together to form a capacitor element (of which the static capacitance was 670 $\mu$F at a frequency of 120 Hz when impregnated with an ethylene glycol solution containing 10% by weight of ammonium adipate).

The capacitor element was then immersed in a solution containing one part of ethylene-dioxythiophene as the heterocyclic monomer, two parts of p-toluene-sulfonic acid ferric salt as the oxidizing agent, and four parts of n-butanol as the polymerizing agent and, after taken out, left intact at 85° C. for 60 minutes to yield a solid electrolyte of polyethylene-dioxythiophene, which is a chemically polymerized conductive polymer, between the positive electrode foil and the negative electrode foil.

Then, the capacitor element was rinsed, dried, and enclosed in an aluminum case together with a resin vulcanized butyl rubber sealant (comprising 30 parts of butylpolymer, 20 parts of carbon, and 50 parts of inorganic filler and having a hardness of 70 IRHD, the international unit of rubber hardness). After the opening of the case was sealed off by curling, both leads extending from the positive and negative electrode foils were joined to a base strip made of polyphenylene sulfide and bent flat to fabricate a surface-mount type solid electrolytic capacitor (measured 10 mm in diameter and 10 mm in height)

EXAMPLE 11

Except that before yielding the solid electrolyte of polyethylene-dioxythiophene, the capacitor element was. immersed in a water solution containing 1.0% of polyethylene-dioxythiophene-polystyrene-sulfonic acid and dried at 150° C. for five minutes to yield layers of polyethylene-dioxythiophene-polystyrene-sulfonic acid on the dielectric oxide film, the negative electrode foil, and the fabric separator, the same manner as of Example 10 was used to fabricate Example 11.

EXAMPLE 12

Except that polyethylene-dioxythiophene of the sold electrolyte was replaced by TCNQ which was dissolved at a temperature of 200° C. or more for impregnation and cooled down to yield a conductive TCNQ layer on the capacitor element, the manner as of Example 10 was used to fabricate Example 12.

EXAMPLE 13

Except that the heterocyclic monomer was one part of pyrrole, the oxidizing agent was two parts of ammonium peroxide, and the polymerizing agent was a mixture of one part of methanol and three parts of water, the same manner as of Example 10 was used to fabricate Example 13.

EXAMPLE 14

Except that the unwoven fabric separator was replaced by another unwoven fabric separator (50 μm in thickness and 25 g/m² in weighing) made by span bonding a resin mixture of polyethylene-terephthalate (20% by weight) and polypropylene (80% by weight), the same manner as of Example 10 was used to fabricate Example 14.

EXAMPLE 15

Except that the unwoven fabric separator was replaced by another unwoven fabric separator (50 μm in thickness and 25 g/m² in weighing) made by wet processing a polyethylene-terephthalate resin, the same manner as of Example 10 was used-to fabricate Example 15.

EXAMPLE 16

Except that the unwoven fabric separator was replaced by a mixed gossamer unwoven fabric separator (50 μm in thickness and 25 g/m² in weighing) made by wet processing a mixture of polyethylene-terephthalate resin (80% by weight), polypropylene resin (10% by weight), Manila hemp (5% by weight), Kraft fabric (4% by weight), and Vinylon fabric (1% by weight), the same manner as of Example 10 was used to fabricate Example 16.

Comparison 3

Except that the span-bonded separator was replaced by a glass fiber based unwoven fabric (80 μm in thickness and 10 g/m² in weighing), the same manner as of Example 10 was used to fabricate Comparison 3.

Comparison 4

Except that the span-bonded separator was replaced by a melt-blown unwoven fabric (50 μm in thickness and 25 g/m² in weighing), the same manner as of Example 10 was used to fabricate Comparison 4.

Comparison 5

Except that an electrolyte-filled paper of Manila hemp (45 μm in thickness) was sandwiched between a positive electrode foil and a negative electrode foil and rolled together to form a capacitor element which was then heated at 275° C. under a nitrogen atmosphere for two hours to carbonize the electrolyte-filled paper between the positive electrode and the negative electrode, the same manner as of Example 10 was used to fabricate Comparison 5.

Comparison 6

Except that the span-bonded separator was replaced by a wet-processed unwoven fabric of polypropylene (50 μm in thickness and 25 g/m² in weighing), the same manner as of Example 10 was used to fabricate Comparison 6.

The solid electrolytic capacitors of Examples 10 to 16 of the present invention and Comparisons 3 to 6 are listed in Table 2 with their measurements of the static capacitance (at 120 Hz of measuring frequency), the impedance (at 100 Hz of measuring frequency), the leakage current (two minutes after the application of 6.3 V of rated voltage), the number of short-circuits (fault actions) during the aging process, and the impedance (at 100 Hz of measuring frequency) after the reflow process (exposed to 200° C. or higher, up to 250° C., for 45 seconds).

The number of test pieces in each case is 50. The static capacitance, the impedance, the leakage current, and the static capacitance after the reflow process are the average values of particular samples which generated no short-circuit.

TABLE 2

|  | Static capacitance (μF, 120 Hz) | Impedance (mΩ, 100 kHz) | Leakage current (μA, 2 min) | Number of short-circuits | Impedance after reflow (mΩ, 100 kHz) |
| --- | --- | --- | --- | --- | --- |
| Example 10 | 603 | 9 | 38 | 0 | 10 |
| Example 11 | 600 | 10 | 37 | 0 | 15 |
| Example 12 | 602 | 10 | 36 | 0 | 10 |
| Example 13 | 602 | 15 | 34 | 0 | 14 |
| Example 14 | 601 | 14 | 34 | 0 | 14 |
| Example 15 | 600 | 13 | 34 | 0 | 14 |
| Example 16 | 601 | 13 | 35 | 0 | 15 |
| Comparison 3 | 430 | 40 | 55 | 7 | 80 |
| Comparison 4 | 600 | 11 | 58 | 8 | 12 |
| Comparison 5 | 430 | 45 | 60 | 10 | 88 |
| Comparison 6 | 429 | 44 | 60 | 10 | 88 |

As apparent from Table 2, the solid electrolytic capacitors of Examples 10 to 16, each having a separator made by span bonding a resin or an unwoven fabric made by wet processing a polyester resin, improve the tightness and the bonding strength between the separator and the solid electrolyte and can thus be much lowered in the impedance at higher frequencies than Comparisons 3, 5, and 6 (which employ as the separator a glass fiber unwoven fabric, a carbonized electrolyte-filled paper, and a wet-processed polypropylene unwoven fabric respectively).

Also, as the solid electrolyte of polyethylene-dioxythiophene is closely bonded on to the separator, a change in the impedance after the reflow process will be minimized hence improving the operational reliability of the solid electrolytic capacitor of surface mount type.

On the other hand, the solid electrolytic capacitors of Comparisons 3 to 6 (using as the separator a glass fiber unwoven fabric, a melt-blown unwoven fabric, a carbonized electrolyte-filled paper, and a wet-processed polypropylene unwoven fabric respectively) exhibit more numbers of short-circuits occurred during the aging process due to direct contact between the positive electrode foil and the negative electrode foil resulting from less physical strength of the separators.

Next, Characteristic examples of the tenth and twelfth embodiments are explained.

EXAMPLE 17

An unwoven fabric separator (50 μm in thickness, 25 g/m² in weighing, and 0.5 g/cm³ in density) made by span bonding a polyethylene terephthalate resin was sandwiched between a positive electrode foil of aluminum coated with a dielectric oxide film by carrying out an anode oxidizing process after an etching process for developing a rough surface and a negative electrode coated with a dielectric oxide film of 0.8 V in withstand voltage by the anode oxidizing process and rolled together to form a capacitor element of a wound-roll type. The capacitor element was then immersed in an ethylene glycol solution containing 10% by weight of ammonium adipate and its static capacitance was measured 200 μF at 120 Hz.

Succeedingly, the capacitor element was immersed in a water solution containing 1.0% of polyethylene-dioxythiophene-polystyrene-sulfonic acid, dried at 150° C. for five minutes to yield layers of polyethylene-dioxythiophene-polystyrene-sulfonic acid on the separator and on the dielectric oxide films of the positive and negative electrode foils.

The capacitor element was further immersed in a solution comprising one part of ethylene-dioxythiophene as the heterocyclic monomer, two parts of p-toluene-sulfonic acid ferric salt as the oxidizing agent, and four parts of n-butanol as the polymerizing agent and, after taken out, left intact at 85° C. for 60 minutes to yield a chemically polymerized conductive polymer of polyethylene-dioxythiophene between the positive electrode foil and the negative electrode foil.

Then, the capacitor element was rinsed, dried, and enclosed in an aluminum case together with a resin vulcanized butyl rubber sealant (comprising 30 parts of butyl polymer, 20 parts of carbon, and 50 parts of inorganic filler and having a hardness of 70 IRHD, the international unit of rubber hardness). After the opening of the case was sealed off by curling, both leads extending from the positive and negative electrode foils were joined to a base strip made of polyphenylene sulfide and bent flat to fabricate a surface-mount type solid electrolytic capacitor (measured 10 mm in diameter and 10 mm in height).

EXAMPLE 18

Except that the negative electrode foil coated with the dielectric oxide film of 0.8 V in withstand voltage by the anode oxidizing process was replaced by a negative electrode foil coated with each of dielectric oxide films of 0.5 V, 1 V, 5 V, 7 V, 10 V, and 12 V in withstand voltage by the anode oxidizing process, the same manner as of Example 17 was used to fabricate a surface-mount type solid electrolytic capacitor of Example 18.

EXAMPLE 19

Except that the separator was replaced by an unwoven separator made by span bonding a polyethylene-terephthalate resin, of which density was varied along the thickness (while the total thickness was 50 μm, the density was 0.8 g/cm$^3$ for 30 μm and 0.2g/cm$^3$ for 20 μm), the separator bonded at the lower density side to the negative electrode foil, the same manner as of Example 17 was used to fabricate a surface-mount type solid electrolytic capacitor of Example 19.

EXAMPLE 20

Except that the separator was replaced by a mixed gossamer unwoven fabric made of Rayon and glass fiber (50 μm in thickness, 25 g/m$^2$ in weighing, and 0.5 g/cm$^3$ in density), the same manner as of Example 17 was used to fabricate a surface-mount type solid electrolytic capacitor of Example 20.

EXAMPLE 21

Except that the separator was replaced by an unwoven fabric made by span bonding polypropylene (50 μm in thickness, 25 g/m$^2$ in weighing, and 0.5 g/cm$^3$ in density), the same manner as of Example 17 was used to fabricate a surface-mount type solid electrolytic capacitor of Example 21.

EXAMPLE 22

Except that the heterocyclic monomer was one part of pyrrole, the oxidizing agent was two parts of ammonium peroxide, and the polymerizing agent was a mixture of one part of methanol and three parts of water, the same manner as of Example 17 was used to fabricate a surface-mount type solid electrolytic capacitor of Example 22.

Comparison 7

Except that the negative electrode foil coated with the dielectric oxide film of 0.8 V in withstand voltage was replaced by a negative electrode foil coated with no dielectric oxide film (of which a natural oxide film exhibited 0.3 V of withstand voltage), the same manner as of Example 17 was used to fabricate a surface-mount type solid electrolytic capacitor of Comparison 7.

The solid electrolytic capacitors of Examples 17 to 22 of the present invention and Comparison 7 are listed in Table 3 with their measurements of the static capacitance (at 120 Hz of measuring frequency), the impedance (at 100 Hz of measuring frequency), the leakage current (2 minutes after the application of 16 V of rated voltage), and the number of short-circuits during the aging process.

The number of test pieces in each case is 50. The static capacitance, the impedance, and the leakage current are the average values of particular samples which generated no short-circuit.

TABLE 3

|  | Cathode withstand voltage | Static capacitance (μF, 120 Hz) | Impedance (mΩ, 100 kHz) | Leakage current (μA, 2 min) | Number of short-circuits |
| --- | --- | --- | --- | --- | --- |
| Example 17 | 0.8 V | 150 | 18 | 100 | 0 |
| Example 18 | 0.5 V | 125 | 35 | 105 | 0 |
|  | 1 V | 155 | 22 | 102 | 0 |
|  | 5 V | 154 | 21 | 102 | 0 |
|  | 7 V | 148 | 23 | 101 | 0 |
|  | 10 V | 146 | 25 | 105 | 0 |
|  | 12 V | 136 | 32 | 110 | 0 |
| Example 19 |  | 180 | 12 | 100 | 0 |
| Example 20 |  | 146 | 20 | 210 | 2 |
| Example 21 |  | 145 | 20 | 102 | 0 |
| Example 22 |  | 151 | 18 | 101 | 0 |
| Comparison 7 |  | 94 | 51 | 102 | 0 |

As apparent from Table. 3, the solid electrolytic capacitors of Examples 17 and 18 having the dielectric oxide film of not greater than 10 V in withstand voltage provided on the negative electrode foil are higher in the static capacitance drawing rate than that of Comparison 7, hence exhibiting favorable levels of the impedance.

In Example 18, when the withstand voltage across the dielectric oxide film on the negative electrode foil is greater than 10 V, the static capacitance drawing rate is decreased and the impedance is increased. However, when the withstand voltage is 0.5 V or smaller, the characteristics are similar to those of Comparison 7. Accordingly, the withstand voltage across the dielectric oxide film on the negative electrode foil ranges preferably from 0.8 V to 10 V.

As the solid electrolytic capacitor of Example 19 has the separator varied in density along the thickness and joined at its lower density side with the negative electrode foil its static capacitance is greater than that of Example 17 having a uniform thickness of the separator and its impedance is favorably lower.

While Examples 20 and 21 are identical to Example 17 where the separator is made of a resin-soaked unwoven fabric and the dielectric oxide film on the negative electrode foil has a desired level-of withstand voltage, they are slightly lower in the static capacitance than Example 17.

This is because the separator of Example 17 is made of polyethylene-terephthalate which is a polyester resin having a higher adhesivity to polyethylene-dioxythiophene. The advantage of the present invention can more explicitly be emphasized as compared with Examples 20 and 21 having the separator of Rayon or polypropylene.

Also, Example 20 having the mixed gossamer separator made of Rayon and glass fiber exhibits a higher level of voltage leakage due to the effect of glass fiber and even a small number of short-circuits.

While the solid electrolytic capacitor of Example 22 employs pyrrole which replaces ethylene-dioxythiophene of Example 17, its characteristics are similar to those of Example 17.

Characteristic examples of the eleventh and twelfth embodiments are now explained.

EXAMPLE 23

An unwoven fabric separator (50 μm in thickness, 25 g/m² in weighing, and 0.5 g/cm³ in density) made by span bonding a polyethylene terephthalate resin was sandwiched between a positive electrode foil of aluminum coated with a dielectric oxide film by carrying out an anode oxidizing process after an etching process for developing a rough surface and a negative electrode coated with a metal of titanium by a vacuum vapor deposition process and rolled together to form a capacitor element of a wound-roll type (After the capacitor element was immersed in an ethylene glycol solution containing 10% by weight of ammonium adipate, its static capacitance was measured 700 μF at 120 Hz).

Succeedingly, the capacitor element was immersed in a water solution containing 1.0% of polyethylene-dioxythiophene-polystyrene-sulfonic acid, dried at 150° C. for five minutes to yield layers of polyethylene-dioxythiophene-polystyrene-sulfonic acid on the separator and on the dielectric oxide films of the positive and negative electrode foils.

The capacitor element was further immersed in a solution comprising one part of ethylene-dioxythiophene as the heterocyclic monomer, two parts of p-toluene-sulfonic acid ferric salt as the oxidizing agent, and four parts of n-butanol as the polymerizing agent and, after taken out, left intact at 85° C. for 60 minutes to yield a chemically polymerized conductive polymer of polyethylene-dioxythiophene between the positive electrode foil and the negative electrode foil.

Then, the capacitor element was rinsed, dried, and enclosed in an aluminum case together with a resin vulcanized butyl rubber sealant (comprising 30 parts of butyl polymer, 20 parts of carbon, and 50 parts of inorganic filler and having a hardness of 70 IRHD, the international unit of rubber hardness). After the opening of the case was sealed off by curling, both leads extending from the positive and negative electrode foils were joined to a base strip made of polyphenylene sulfide and bent flat to fabricate a surface-mount type solid electrolytic capacitor (measured. 10 mm in diameter and 10 mm in height).

EXAMPLE 24

Except that the negative:electrode foil coated with the metal of titanium by the vacuum vapor deposition process was replaced by a negative electrode foil coated with titanium nitride by the vacuum vapor deposition process, the same manner as of Example 23 was used to fabricate a surface-mount type solid electrolytic capacitor of Example 24.

EXAMPLE 25

Except that the negative electrode foil coated with the metal of titanium by the vacuum vapor deposition process was replaced by a negative electrode foil coated with zirconium nitride by the vacuum vapor deposition process, the same manner as of Example 23 was used to fabricate a surface-mount type solid electrolytic capacitor of Example 25.

EXAMPLE 26

Except that the negative electrode foil coated with the metal of titanium by the vacuum vapor deposition process was replaced by a negative:electrode foil coated with hafnium nitride by the vacuum vapor deposition process, the same manner as of Example 23 was used to fabricate a surface-mount type solid electrolytic capacitor of Example 26.

EXAMPLE 27

Except that the negative electrode foil coated with the metal of titanium by the vacuum vapor deposition process was replaced by a negative electrode foil coated with titanium oxide by the vacuum vapor deposition process, the same manner as of Example 23 was used to fabricate a surface-mount type solid electrolytic capacitor of Example 27.

EXAMPLE 28

Except that the negative electrode foil coated with the metal of titanium by the vacuum vapor deposition process was replaced by a negative electrode foil coated with titanium carbide by the vacuum vapor deposition process, the same manner as of Example 23 was used to fabricate a surface-mount type solid electrolytic capacitor of Example 28.

EXAMPLE 29

Except that the negative electrode foil coated with the metal of titanium by the vacuum vapor deposition process was replaced by a negative electrode foil coated with carbon by the vacuum vapor deposition process, the same manner as of Example 23 was used to fabricate a surface-mount type solid electrolytic capacitor of Example 29.

EXAMPLE 30

Except that the separator was replaced by an unwoven separator made by span bonding a polyethylene-terephthalate resin, of which density was varied along the thickness (while the total thickness was 50 μm, the density was 0.8g/cm³ for 30 μm and 0.2 g/cm³ for 20 μm), the separator bonded at the lower density side to the negative electrode foil, the same manner as of Example 23 was used to fabricate a surface-mount type solid electrolytic capacitor of Example 30.

Comparison 8

Except that the negative electrode foil-coated with the metal of titanium by the vacuum vapor deposition process was replaced by a negative electrode foil of etched aluminum (of which the thermal oxide film exhibited 0.6 V of withstand voltage), the same manner as of Example 23 was used to fabricate a surface-mount type solid electrolytic capacitor of Comparison 8.

The solid electrolytic capacitors of Examples 23 to 30 of the present invention and Comparison 8 are listed in Table 4 with their measurements of the static capacitance (at 120 Hz of measuring frequency), the impedance (at 100 Hz of measuring frequency), the leakage current (2 minutes after the application of 16 V of rated voltage), and the number of short-circuits during the aging process.

The number of test pieces in each case is 50. The static capacitance, the impedance, and the leakage current are the average values of particular samples which generated no short-circuit.

TABLE 4

|  | Static capacitance ($\mu F$, 120 Hz) | Impedance (m$\Omega$, 100 kHz) | Leakage current ($\mu A$, 2 min) | Number of short-circuits |
|---|---|---|---|---|
| Example 23 | 668 | 13 | 38 | 0 |
| Example 24 | 679 | 8 | 32 | 0 |
| Example 25 | 677 | 9 | 34 | 0 |
| Example 26 | 676 | 9 | 35 | 0 |
| Example 27 | 671 | 12 | 30 | 0 |
| Example 28 | 665 | 13 | 40 | 0 |
| Example 29 | 669 | 11 | 41 | 0 |
| Example 30 | 670 | 12 | 38 | 0 |
| Comparison 8 | 555 | 30 | 102 | 0 |

As apparent from Table 4, the solid electrolytic capacitors of Examples 23 to 29, as compared with Comparison 8, has the negative electrode foil coated with titanium, titanium nitride, zirconium nitride, hafnium nitride, titanium oxide, titanium carbide, and carbon respectively, hence increasing the static capacitance drawing rate and lowering the impedance. In particular, the nitride coated negative electrode foil exhibits significantly a higher value of the static capacitance drawing rate and a lower level of the impedance.

As the solid electrolytic capacitor of Example 30 has the separator varied in density along the thickness between the positive and negative electrode foils and joined at its lower density side with the negative electrode foil, its static capacitance is greater than that of Example 23 having a uniform thickness of the separator and its impedance is favorably lower.

Characteristic examples of the thirteenth to fifteenth embodiments are then explained.

EXAMPLE 31

A separator (50 $\mu$m in thickness and 25 g/m$^2$ in weighing) made by span bonding a polyethylene-terephthalate resin was sandwiched between a positive electrode foil and a negative electrode foil and rolled together to form a capacitor element of a wound-roll type which was then covered at its outer surface with polyphenylene sulfide based adhesive tape of a length which was 1.5 times longer than the overall length of the capacitor element (After the capacitor element was immersed in an ethylene glycol solution containing 10% by weight of ammonium adipate, its static capacitance was measured 670 $\mu$F at 120 Hz).

The capacitor element was further immersed in a solution comprising one part of ethylene-dioxythiophene as the heterocyclic monomer, two parts of p-toluene ferric sulfonate as the oxidizing agent, and four parts of n-butanol as the polymerizing agent and, after taken out, left intact at 85° C. for 60 minutes to yield a chemically polymerized conductive polymer of polyethylene-dioxythiophene between the two electrode foils.

Then, the capacitor element was rinsed and dried at 120° C. for 30 minutes. This action was followed by transferring the capacitor element into a dry-air globe box and drying it under a dry-air atmosphere at 120° C. for one hour to reduce its content of water. The dried capacitor element was then enclosed in an aluminum alloy case together with a resin vulcanized butyl rubber sealant (comprising 30 parts of butyl polymer, 20 parts of carbon, and 50 parts of inorganic filler and having a hardness of 70 IRHD, the international unit of rubber hardness and a resiliency of 450 N/cm$^2$ at 250° C.). After the opening of the case was sealed off by curling, both leads extending from the positive and negative electrode foils were joined to a base strip made of polyphenylene sulfide and bent flat to fabricate a surface-mount type solid electrolytic capacitor (measured 10 mm in diameter and 10.2 mm in height).

The solid electrolytic capacitor was disassembled to separate the capacitor element in the same dry-air globe box while great care was taken not to absorb water in the air. The capacitor element was measured its content of water by an $N^2$ gas feed Karl-Fischer system equipped with a water evaporating heater. The content of water was 0.80% based on the total weight of the positive electrode foil, the negative electrode foil, the separator, the solid electrolyte, and the covering tape (i.e. the weight of the capacitor element excluding both, positive and negative, leads). The content of water measured by that system is expressed by W1.

For verifying the accuracy of a calculated value of the content of water, the capacitor element excluding the two, positive and negative, leads was examined by subtracting its weight after drying at 120° C. for one hour from its non-dried weight. A percentage of the weight change was 0.81% (equivalent to the absorption of water by the capacitor element and thus expressed W2). As understood, the content of water can be measured at a quite high accuracy.

EXAMPLE 32

Except that the oxidizing agent was one part of naphthalene ferric sulfonate and one part of triisopropyl-naphthalene ferric sulfonate while the polymerizing agent was four parts of ethanol, the same manner as of Example 31 was used to fabricate Example 32. In this example, the content of water was measured 0.89% for W1 and 0.89% for W2.

EXAMPLE 33

Except that the heterocyclic monomer was one part of pyrrole, the oxidizing agent was two parts of ammonium peroxide, and the polymerizing agent was a mixture of one part of methanol and three parts of water, the same manner as of Example 31 was used to fabricate Example 33. In this example, the content of water was measured 0.88% for W1 and 0.88% for W2.

EXAMPLE 34

Except that the separator was replaced by a separator (50 $\mu$m in thickness and 25 g/m$^2$ in weighing) made by span bonding a polypropylene resin, the same manner as of Example 31 was used to fabricate Example 34. In this example, the content of water was measured 0.94% for W1 and 0.94% for W2.

EXAMPLE 35

Except that the separator was replaced by a nitrate cellulose fabric separator made by nitrating an electrolyte-filled Manila hemp paper, the same manner as of Example 31 was used to fabricate Example 35. In this example, the content of water was measured 0.97% for W1 and 0.96% for W2.

EXAMPLE 36

Except that the separator was replaced by a glass fiber unwoven separator (80 $\mu$m in thickness and 10 g/m$^2$ in weighing), the same manner as of Example 31 was used to fabricate Example 36. In this example, the content of water was measured 0.97% for W1 and 0.97% for W2.

EXAMPLE 37

An electrolyte-filled paper of Manila hemp (50 $\mu$m in thickness) was sandwiched between a positive electrode foil and a negative electrode foil and rolled together to form a capacitor element which was then heated under a nitrogen atmosphere at 275° C. for two hours to carbonize the electrolyte-filled paper between the two electrode foils. The capacitor element was further immersed in a mixture solution consisting of, at a ratio of 1:1, a water solution containing 1.3% of a solid form of polyethylene-dioxythiophene-polystyrene-sulfonic acid, a derivative of polystyrene-sulfonic acid, and a suspending solution (5.0% of solids) of sulfonic acid denatured polyethylene-terephthalate which acted as a binder for declining the absorption of water and dried at 150° C. for 10 minutes. The capacitor element was then immersed in a solution comprising one part of ethylene-dioxythiophene as the heterocyclic monomer, two parts of p-toluene ferric sulfonate as the oxidizing agent, and four parts of n-butanol as the polymerizing agent and, after taken out, left intact at 85° C. for 60 minutes to yield a chemically polymerized conductive polymer of polyethylene-dioxythiophene between the two electrode foils. As for the other process except the above, the same manner as of Example 31 was used to fabricate Example 37. In this example, the content of water was measured 0.78% for W1 and 0.77% for W2.

EXAMPLE 38

Except that the sealant was replaced by a peroxide vulcanized butyl rubber sealant (comprising 32 parts of butylpolymer, 20 parts of carbon, and 48 parts of inorganic filler and having a hardness of 68 IRHD, the international unit of rubber hardness and a resiliency of 400 N/cm$^2$ at 250° C.) which was prepared with dicumyl peroxide as a vulcanizer, the same manner as of Example 31 was used to fabricate Example 38. In this example, the content of water was measured 0.79% for W1 and 0.78% for W2.

EXAMPLE 39

Except that the capacitor element was not transferred into the dry-air globe box but simply assembled under a normal condition at a temperature of 30° C. and a relative moisture of 60%RH (the time required for assembly was 1.0 hour from the completion of drying out the capacitor element), the same manner as of Example 31 was used to fabricate Example 39. In this example, the content of water was measured 1.2% for W1 and 1.1% for W2.

EXAMPLE 40

Except that the solution containing one part of ethylene-dioxythiophene as the heterocyclic monomer, two parts of p-toluene ferric sulfonate as the oxidizing agent, and four parts of n-butanol as the polymerizing agent was added with one part of a suspending solution (30% of solids) of carbonic acid denatured polyethylene-terephthalate which acted as a binder for declining the absorption of water, the same manner as of Example 31 was used to fabricate Example 40. In this example, the content of water was measured 0.75% for W1 and 0.73% for W2.

EXAMPLE 41

Except that the separator was replaced by an unwoven separator (50 $\mu$m in thickness and 22.5 g/m$^2$ in weighing) made by wet processing a polyethylene-terephthalate fabric and its derivative, the same manner as of Example. 31 was used to fabricate Example 41. In this example, the content of water was measured 0.90% for W1 and 0.91% for W2.

Comparison 9

A separator (50 $\mu$m in thickness and 25 g/m$^2$ in weighing) made by span bonding a polyethylene-terephthalate resin was sandwiched between a positive electrode foil and a negative electrode foil and rolled together to form a capacitor element of a wound-roll type (after the capacitor element was immersed in an ethylene glycol solution containing 10% by weight of ammonium adipate, its static capacitance was measured 670 $\mu$F at 120 Hz).

Succeedingly, the capacitor element was immersed in a solution comprising one part of ethylene-dioxythiophene as the heterocyclic monomer, two parts of p-toluene ferric sulfonate as the oxidizing agent, and four parts of n-butanol as the polymerizing agent and, after taken out, left intact at 85° C. for 60 minutes to yield a chemically polymerized conductive polymer of polyethylene-dioxythiophene between the two electrode foils.

Then, the capacitor element was rinsed and dried for 30 minutes at a temperature of 120° C. which was higher than the boiling point of n-butanol of the polymerizing agent. The dried capacitor element was then enclosed in an aluminum alloy case together with a resin vulcanized butyl rubber sealant (comprising 32 parts of butyl polymer, 20 parts of carbon, and 48 parts of inorganic filler and having a hardness of 68 IRHD, the international unit of rubber hardness, and a resiliency of 400 N/cm$^2$ at 250° C.) under a normal condition at a temperature of 30° C. and a relative moisture of 60%RH. After the opening of the case was sealed off by curling, both leads extending from the positive and negative electrode foils were joined to a base strip made of polyphenylene sulfide and bent flat to fabricate a surface-mount type solid electrolytic capacitor (measured 10 mm in diameter and 10.2 mm in height). In this comparison, the content of water was measured 1.2% for W1 and 1.1% for W2.

The solid electrolytic capacitors of Examples 31 to 41 of the present invention and Comparison 9 are listed in Table 5 with their measurements of the static capacitance (at 120 Hz of measuring frequency), the impedance (at 100 Hz of measuring frequency), the expansion of the sealed end of the solid electrolytic capacitor after the reflow process for surface-mount soldering (provided that the peak temperature is 250° C. and the duration for being exposed to 200° C. or higher is 45 seconds), and the number of soldering faults resulting from floating of the leads due to the expansion of the sealed end.

The number of test pieces in each case is 50. The static capacitance, the impedance, and the expansion of the sealed end are the average values of 50 test pieces.

TABLE 5

| | Static capacitance ($\mu$F, 120 Hz) | Impedance (m$\Omega$, 100 kHz) | Number of soldering faults | Expansion of sealed end (mm) |
|---|---|---|---|---|
| Example 31 | 603 | 9 | 0 | 0.10 |
| Example 32 | 600 | 10 | 0 | 0.12 |
| Example 33 | 595 | 11 | 0 | 0.13 |
| Example 34 | 602 | 14 | 0 | 0.15 |
| Example 35 | 602 | 12 | 0 | 0.15 |
| Example 36 | 600 | 12 | 0 | 0.16 |
| Example 37 | 596 | 12 | 0 | 0.16 |
| Example 38 | 602 | 10 | 0 | 0.19 |
| Example 39 | 602 | 10 | 0 | 0.19 |
| Example 40 | 599 | 10 | 0 | 0.03 |
| Example 41 | 602 | 11 | 0 | 0.14 |
| Comparison 9 | 599 | 10 | 13 | 0.42 |

As apparent from Table 5, the solid electrolytic capacitors of Examples 31 to 38, 40, and 41 successfully limit the content of water in each capacitor element to smaller than 1% by weight based on the weight of the capacitor element while having the capacitor element enclosed in the case with its opening sealed off, hence avoiding abrupt increase of the inner pressure in the case at any high temperature condition during the surface mounting process. This can minimize the expansion (a plastic deformation caused by an increase in the inner pressure) of the sealed end of the solid electrolytic capacitor as compared with Comparison 9; the expansion stays below a limit (=0.20 mm) where an unwanted fault may possibly occur in the surface mounting process.

As the expansion of the sealed end is controlled, any soldering fault due to floating of the leads during the process can hardly be avoided and the solid electrolytic capacitors can exhibit stable, favorable characteristics during the surface mounting process at higher temperatures.

Also, the solid electrolytic capacitors of Examples 31 to 37 and 39 to 41 have the opening of each capacitor case sealed off with the peroxide vulcanized butyl rubber sealant which has a resiliency of not smaller than 450 N/cm$^2$ at 250° C. As the sealed end gains a generous mechanical strength resistive to the practical temperature (245° C.) during the surface mounting process, the solid electrolytic capacitors of the above examples are smaller in the expansion (a plastic deformation caused by an abrupt increase in the inner pressure) of the sealed end than that of Comparison 9 and more particularly, can successfully be controlled with its expansion below the limit (=0.20 mm) where an undesired fault may occur.

Equally, as the expansion of the sealed end is controlled, any soldering fault due to floating of the leads during the process can hardly be avoided and the solid electrolytic capacitors can exhibit stable, favorable characteristics during the surface mounting process at higher temperatures.

The solid electrolytic capacitors of Examples 37 and 40 of the present invention have the denatured polyethylene-terephthalate resin, a type of polyester, provided as the binder in the solid electrolyte for declining the absorption of water, hence limiting the content of water to a minimum in the capacitor element. This minimizes the expansion of the sealed end of the capacitor and allows the solid electrolytic capacitor to be surface mounted stably under higher temperature conditions.

According to the present invention, the solid electrolytic capacitor of a surface mount type ensures improved levels of the impedance as well as stable, favorable characteristics during the surface mounting process at higher temperatures.

Characteristic examples of the sixteen to nineteenth embodiments and the twenty second embodiment of the present invention will be described.

EXAMPLE 42

A separator (50 $\mu$m in thickness and 25 g/m$^2$ in weighing) made of polyethylene-terephthalate fiber was sandwiched between a positive electrode foil coated with a dielectric oxide film and a negative electrode foil of etched aluminum and rolled together to form an aluminum capacitor element of a wound-roll type (after the capacitor element was immersed in an ethylene glycol solution containing 10% by weight of ammonium adipate, its static capacitance was measured 670 $\mu$F at 120 Hz).

The capacitor element was further immersed in a polymeric mixture solution (a weight ratio of bivalent iron to trivalent iron being 0.005 and a molar ratio of p-toluene-sulfonic acid to trivalent iron being 3.3) comprising one part of ethylene-dioxythiophene as the heterocyclic monomer and six parts of n-butanol oxidizing solution (referred to as an oxidizing solution A) containing 40% by weight of p-toluene ferric sulfonate as the oxidizing agent and, after taken out, left intact at 85° C. for 60 minutes to yield a chemically polymerized conductive polymer of polyethylene-dioxythiophene between the two electrode foils.

Then, after rinsed and dried, the capacitor element was enclosed in an aluminum case together with a resin vulcanized butyl rubber sealant (comprising 30 parts of butyl polymer, 20 parts of carbon, and 50 parts of inorganic filler and having a hardness of 70 IRHD, the international unit of rubber hardness). When the opening of the case had been sealed off by curling, both leads extending from the positive and negative electrode foils were joined to a base strip made of polyphenylene sulfide and bent flat to fabricate a surface-mount type solid electrolytic capacitor (measured 10 mm in diameter and 10 mm in height).

EXAMPLE 43

Except that the oxidizing solution A was replaced by another oxidizing solution (a weight ratio of bivalent iron to trivalent iron being 0.01 and a molar ratio of p-toluene-sulfonic acid to trivalent iron being 3.3) which was prepared by left intact the oxidizing solution A at 40° C. for 60 days, the same manner as of Example 42 was used to fabricate Example 43.

EXAMPLE 44

Except that the oxidizing solution A was replaced by another oxidizing solution (a weight ratio of bivalent iron to trivalent iron being 0.02 and a molar ratio of p-toluene-sulfonic acid to trivalent iron being 3.0) which was prepared by left intact the oxidizing solution A at 40° C. for 90 days, the same manner as of Example 42 was used to fabricate Example 44.

EXAMPLE 45

Except that the oxidizing solution A was replaced by another oxidizing solution (a weight ratio of bivalent iron to trivalent iron being 0.03 and a molar ratio of p-toluene-sulfonic acid to trivalent iron being 2.9) which was prepared by left intact the oxidizing solution A at 40° C. for 120 days, the same manner as of Example 42 was used to fabricate Example 45.

EXAMPLE 46

The oxidizing solution A of Example 42 was dried out at 120° C. to extract a crystal form of p-toluene-sulfonic acid (through separating a solid component of p-toluene-sulfonic acid ferric salt from a solvent of n-butanol).

The crystal form was then dissolved in n-butanol (a commercial product, class one) to have 40% by weight of solids in the n-butanol solution. The other processes were identical to those of Example 42 to fabricate Example 46.

As a result, the weight ratio of bivalent iron to trivalent iron in the oxidizing solution was 0.1 while the molar ratio of p-toluene-sulfonic acid to trivalent iron was 2.5.

The solid aluminum electrolytic capacitors of Examples 42 to 46 of the present invention are listed in Table 6 with their measurements of the static capacitance (at 120 Hz of measuring frequency), the impedance (at 100 Hz of measuring frequency), and change range of the impedance.

The number of test pieces in each case is 50. The static capacitance and the impedance are the average values of 50 test pieces

TABLE 6

| | Static capacitance | Impedance | Maximum and minimum of impedance (mΩ, 100 kHz) | | |
|---|---|---|---|---|---|
| | ($\mu$F, 120 Hz) | (mΩ, 100 kHz) | Max. | Min. | Change |
| Example 42 | 584 | 10 | 12 | 8 | 4 |
| Example 43 | 580 | 18 | 20 | 14 | 6 |
| Example 44 | 578 | 19 | 24 | 17 | 7 |
| Example 45 | 550 | 30 | 55 | 17 | 38 |
| Example 46 | 497 | 45 | 95 | 25 | 70 |

As apparent from Table 6, the solid aluminum electrolytic capacitors of Examples 42 to 44 of the present invention are higher in the static capacitance and lower in the impedance than those of Examples 45 and 46, hence minimizing change in the impedance and thus in the electric characteristics.

It is understood from the measurements of the impedance of Examples 42 to 46 that the weight ratio of bivalent iron to trivalent iron in the oxidizing solution is preferably not higher than 0.02.

The impedance is unfavorably sharply increased when the weight ratio of bivalent iron to trivalent iron in the oxidizing solution exceeds 0.02.

It is also proved that the molar ratio of bivalent iron to trivalent iron in the oxidizing solution is preferably higher than 3.0. The impedance is unfavorably increased when the molar ratio of bivalent iron to trivalent iron in the oxidizing solution is blow 3.0.

When an-oxidizing solution was prepared by adding the oxidizing solution A of Example 42 with p-toluene-sulfonic acid (a commercial product, class one) to adjust the molar ratio of p-toluene-sulfonic acid to trivalent iron in the oxidizing solution to 3.6 and used for the same test, the leakage current was significantly increased (up to a range from 100 to 1000 $\mu$A).

Considering the fact that the leakage current of the solid electrolytic capacitors, of Examples 42 to 46 is not higher than 10 $\mu$A, higher than 3.5 of the molar ratio of p-toluene-sulfonic acid to trivalent iron in the oxidizing solution unfavorably increases the leakage current.

With reference to the above measurements of the impedance, the molar ratio of p-toluene-sulfonic acid to trivalent iron in the oxidizing solution ranges preferably from 3.0 to 3.5.

As also apparent, the use of the oxidizing solution for yielding a conductive polymer and the method according to the present invention permit a solid electrolytic capacitor exhibiting lower change of the electric characteristics to be fabricated more consistently.

Characteristic examples of the twentieth to twenty second embodiments of the present invention are now explained.

EXAMPLE 47

A separator (50 $\mu$m in thickness and 25 g/m$^2$ in weighing) made by span bonding a polyethylene-terephthalate fiber was sandwiched between a positive electrode foil made of aluminum and coated with a dielectric oxide film and a negative electrode foil of etched aluminum and rolled together to form a capacitor element of a wound-roll type (after the capacitor element was immersed in an ethylene glycol solution containing 10% by weight of ammonium adipate, its static capacitance was measured 670 $\mu$F at 120 Hz).

The capacitor element was further immersed in a solution comprising one part of a monomer prepared by distilling under reduced pressure a heterocyclic monomer of ethylene-dioxythiophene (referred to as a monomer A hereinafter) with the use of a reaction solvent of N,N-dimethyl-acetoamide while adjusting the remaining of N,N-dimethyl-acetoamide, which was impurities in the monomer, to substantially 0.8% measured with a gas chromatography analysis meter, two parts of p-toluene ferric sulfonate as the oxidizing agent, and four parts of n-butanol as the polymerizing agent and, after taken out, left intact at 85° C. for 60 minutes to yield a chemically polymerized conductive polymer of polyethylene-dioxythiophene between the two electrode foils.

Then, after rinsed and dried, the capacitor element was enclosed in an aluminum case together with a resin vulcanized butyl rubber sealant (comprising 30 parts of butyl polymer, 20 parts of carbon, and 50 parts of inorganic filler and having a hardness of 70 IRHD, the international unit of rubber hardness). When the opening of the case had been sealed off by curling, both leads extending from the. positive and negative electrode foils were joined to a base strip made of polyphenylene sulfide and bent flat to fabricate a surface-mount type solid electrolytic capacitor (measured 10 mm in diameter and 10 mm in height).

EXAMPLE 48

Except that the monomer A was repeatedly distilled under reduced pressure to decrease the remaining of N,N-dimethyl-acetoamide, which was impurities in the ethylene-dioxythiophene, to substantially 0.6% measured with the gas chromatography analysis meter, the same manner as of Example 47 was used to fabricate Example 48.

EXAMPLE 49

Except that the monomer A was further distilled under reduced pressure to decrease the remaining of N,N-dimethyl-acetoamide, which-was impurities in the ethylene-dioxythiophene, to substantially 0.4% measured with the gas chromatography analysis meter, the same manner as of Example 47 was used to fabricate Example 49.

EXAMPLE 50

Except that the monomer A was further distilled under reduced pressure to decrease the remaining of N,N-dimethyl-acetoamide, which was impurities in the ethylene-dioxythiophene, to substantially 0.3% measured with the gas chromatography analysis meter, the same manner as of Example 47 was used to fabricate Example 50.

Comparison 10

Except that the ethylene-dioxythiophene was not distilled under reduced pressure, the same manner as of Example 47 was used to fabricate Comparison 10.

In the comparison, the remaining of N,N-dimethyl-acetoamide which was impurities in the ethylene-dioxythiophene was measured 1.0% using the gas chromatography analysis meter.

The solid aluminum electrolytic capacitors of Examples 47 to 50 of the present invention and Comparison 10 are listed in Table 7 with their measurements of the static capacitance (at 120 Hz of measuring frequency), the impedance (at 100 Hz of measuring frequency), and standard deviation of the impedance.

The number of test pieces in each case is 50. The static capacitance and the impedance are the average values of 50 test pieces.

TABLE 7

|  | Static capacitance ($\mu$F, 120 Hz) | Impedance (m$\Omega$, 100 kHz) | Standard deviation of impedance (m$\Omega$, 100 kHz) |
| --- | --- | --- | --- |
| Example 47 | 600 | 14 | 1.9 |
| Example 48 | 611 | 12 | 1.8 |
| Example 49 | 615 | 10 | 1.5 |
| Example 50 | 614 | 10 | 1.5 |
| Comparison 10 | 598 | 22 | 4.2 |

As apparent from Table 7, the solid aluminum electrolytic capacitors of Examples 47 to 50 of the present invention are higher in the static capacitance and lower in the impedance than that of Comparison 10, hence minimizing the standard deviation of the impedance and thus changes in the electric characteristics.

It is understood from the measurements of the impedance of Examples 47 to 50 and Comparison 10 that the remaining of N,N-dimethyl-acetoamide in the ethylene-dioxythiophene is preferably low and more preferably not higher than 0.8% of the upper limit.

When the remaining of N,N-dimethyl-acetoamide exceeds 0.8%, the impedance is sharply increased.

The method according to the present invention permits a solid electrolytic capacitor having less change of the electric characteristics to be fabricated more consistently.

While the embodiments of the present invention are illustrated in the form of a wound-roll type of the solid electrolytic capacitor, the present invention is not limited to the wound-roll type but may equally be applicable to another type having a negative electrode layer, a dielectric polymer layer, and a dielectric oxide film provided in this order on a valve metal foil base.

As set forth above, the present invention has the following advantages.

(1) The layer containing an electroconductive polymer and a less conductive polymer is disposed on the dielectric oxide film on the positive electrode made of a valve metal, allowing the electroconductive polymer which is low in the resistivity to be used as the electrolyte on the dielectric oxide film and thus minimizing the resistivity (impedance) of the capacitor.

Also, as the non-electroconductive polymer which is very high in the resistivity is provided on the dielectric oxide film, it can interrupt an undesired effect of electron avalanche which is derived from injury of the dielectric oxide film and releases a significant amount of leakage current or can at least limit the avalanche to a local region before resulting in breakdown of the dielectric (short-circuit). Accordingly, the electrolytic capacitor is successfully minimized in the occurrence of leakage current and improved for avoiding the generation of short-circuit during the aging process.

(2) The unwoven fabric separator made by span bonding a resin based material or wet processing a polyester resin contained material was sandwiched between the positive electrode foil coated with a dielectric oxide film and the negative electrode foil and rolled together to form a capacitor element and its adhesivity and bonding strength to the electrolyte disposed between the two electrode foils in the capacitor element can thus be improved thus minimizing the impedance at higher frequencies.

The separator is favorably rigid enough to attenuate the leakage current and the short-circuit during the aging process,hence contributing to the improvement of the solid electrolytic capacitor in the characteristics of impedance and leakage current.

(3) While the separator is sandwiched between the positive electrode foil coated with a dielectric oxide film and the negative electrode foil coated with a dielectric oxide film having 0.8 to 10 V of withstand voltage and rolled together to fabricate a capacitor element, the solid electrolyte between the positive and negative electrode foils in the capacitor element is an electrically conductive polymer thus allowing the dielectric oxide film on the negative electrode foil to have a higher wetting affinity to the polymeric solution. This enhances the draping of the solid electrolyte of the conductive polymer adjacent to the negative electrode foil, contributing to the lower impedance at higher frequencies and the higher static capacitance drawing rate of the solid electrolytic capacitor.

(4) The negative electrode foil is coated with a layer of a metallic material selected from titanium, zirconium, and hafnium or its compound or a carbon material to improve the wetting affinity between the negative electrode foil and the polymeric solution. This enhances the draping of the solid electrolyte of the conductive polymer adjacent to the negative electrode foil, contributing to the lower impedance at higher frequencies and the higher static capacitance drawing rate of the solid electrolytic capacitor.

(5) With its positive electrode foil having the dielectric oxide film accompanied with the solid electrolyte layer and the negative electrode lead, the capacitor element controlled its content of water to not higher than 1% by weight is enclosed in an outer case, hence allowing the solid electrolytic capacitor of a surface mount type to be improved in the impedance characteristics and the surface mounting performance at higher temperatures.

(6-A) The solid electrolyte is a conductive polymer made by chemically polymerizing a heterocyclic monomer using an oxidizing solution of which the weight ratio of bivalent iron to trivalent iron is not higher than 0.02 or (6-B) the solid electrolyte is a conductive polymer made by chemically polymerizing a heterocyclic monomer using an oxidizing solution of which the molar ratio of aliphatic and/or aromatic sulfonic acid to trivalent iron ranges from 3.0 to 3.5. This allows the highly electrically conductive polymer to be generated at a higher efficiency during the chemical polymerizing process, contributing to the lower change of the static capacitance and the impedance of the solid electrolytic capacitor and the method of the same.

(7) The solid electrolyte is a conductive polymer made by chemically polymerizing a heterocyclic monomer which contains not higher than 0.8% of remaining basic organic solvent, hence permitting the highly conductive polymer to be generated at a higher efficiency during the chemical polymerizing process. This contributes to the lower change of the static capacitance and the impedance of the solid electrolytic capacitor and the method of the same.

Industrial applicability

The solid electrolytic capacitor and its method of the present invention can thus be minimized in the leakage current while exhibiting a greater capacitance and a higher resistance to heat and favorably used as a surface-mount type electronic device. Also, the present invention can provide optimum manufacturing conditions for the oxidizing solution for yielding a conductive polymer and the heterocyclic monomer for preceding the conductive polymer and will thus have extensive applications in various industries.

What is claimed is:

1. A solid electrolytic capacitor comprising a capacitor element fabricated by sandwiching and rolling a separator between a positive electrode foil coated with a dielectric oxide film and a negative electrode foil, wherein a layer containing an electroconductive polymer and a less conductive polymer is provided at least on the dielectric oxide film on the positive electrode foil.

2. A solid electrolytic capacitor according to claim 1, wherein the electroconductive polymer in the layer provided on the dielectric oxide film on the positive electrode foil has a resistivity of not higher than $1.0 \times 10^{10} \Omega/\square$ while the less conductive polymer has a resistivity of higher than $1.0 \times 10^{10} \Omega/\square$.

3. A solid electrolytic capacitor according to claim 2, wherein the electroconductive polymer in the layer provided on the dielectric oxide film on the positive electrode foil is at least a polymer selected from polypyrrole, polyaniline, polyaniline sulfonate, polythiophene, polyethylene-dioxythiophene, polystyrene sulfonic acid, and their derivatives.

4. A solid electrolytic capacitor according to claim 2, wherein the less conductive polymer in the layer provided on the dielectric oxide film on the positive electrode foil is at least a polymer or a copolymer selected from polyvinyl-alcohol, polyvinyl-acetate, polycabonate, polyacrylate, polymethacrylate, polystyrene, polyurethane, polyacrylonitrile, polybutadiene, polyisoprene, polyether, polyester, polyethylene-terephthalate, polybutylene-terephthalate, polyamide, polyimide, butyral resin, silicon resin, melamine resin, alkyd resin, cellulose, nitro-cellulose, bisphenol-A epoxy, bisphenol-F epoxy, alicyclic epoxy, and their derivatives.

5. A solid electrolytic capacitor according to claim 1, wherein the electroconductive polymer in the layer provided on the dielectric oxide film on the positive electrode foil is at least one polymer selected from the group consisting of: polypyrrole, polyaniline, polyaniline sulfonate, polythiophene, polyethylene dioxythiophene, polystyrene sulfonic acid, and their derivatives.

6. A solid electrolytic capacitor according to claim 1, wherein the less conductive polymer in the layer provided on the dielectric oxide film on the positive electrode foil is at least one polymer or one copolymer selected from the group consisting of: polyvinyl-alcohol, polyvinyl-acetate, polycarbonate, polyacrylate, polymethacrylate, polystyrene, polyurethane, polyacrylonitrile, polybutadiene, polyisoprene, polyether, polyester, polyethylene-terephthalate, polybutylene-terephthalate, polyamide, polyimide, butyral resin, silicon resin, melamine resin, alkyd resin, cellulose, nitro-cellulose, bisphenol-A epoxy, bisphenol-F epoxy, alicyclic epoxy, and their derivatives.

7. A solid electrolytic capacitor according to claim 6, wherein the less conductive polymer in the layer provided on the dielectric oxide film on the positive electrode foil is at least one polymer or one copolymer selected from the group consisting of glycidyl denatured polyester, sulfonic acid denatured polyester, and carboxylic acid denatured polyester.

8. A method of producing a solid electrolytic capacitor comprising the steps of: immersing a capacitor element fabricated by sandwiching a separator between a positive electrode foil coated with a dielectric oxide film and a negative electrode foil and rolling together into a solution which contains at least the electroconductive polymer, wherein the electroconductive polymer in the layer provided on the dielectric oxide film on the positive electrode foil is at least one polymer selected from the group consisting of: polypyrrole, polyaniline, polyaniline sulfonate, polythiophene, polyethylene-dioxythiophene, polystyrene sulfonic acid, and their derivatives, and the less conductive polymer, wherein said less conductive polymer is at least one polymer or one copolymer selected from the group consisting of: polyvinyl-alcohol, polyvinyl-acetate, polycarbonate, polyacrylate, polymethacrylate, polystyrene, polyurethane, polyacrylonitrile, polybutadiene, polyisoprene, polyether, polyester, polyethylene-terephthalate, polybutylene-terephthalate, polyamide, polyimide, butyral resin, silicon resin, melamine resin, alkyd resin, cellulose, nitro-cellulose, bisphenol-A epoxy, bisphenol-F epoxy, alicyclic epoxy, and their derivatives, or at least one polymer or one copolymer selected from the group consisting of: glycidyl denatured polyester, sulfonic acid denatured polyester, and carboxylic acid denatured polyester; heating the capacitor element to evaporate a solvent in the solution and thus develop on the dielectric oxide film on the positive electrode foil a layer containing the electroconductive polymer and the less conductive polymer; and immersing the capacitor element in a mixture solution which contains at least an oxidizing solution for polymerizing a conductive polymer and a heterocyclic monomer, or immersing the capacitor element in a solution which contains the oxidizing solution for polymerizing a conductive polymer and then in another solution which contains the heterocyclic monomer, or immersing the capacitor element in a solution which contains the heterocyclic monomer and then in another solution which contains the oxidizing solution for polymerizing a conductive polymer to generate a solid electrolyte made of the conductive polymer between the positive electrode foil and the negative electrode foil.

9. A method of producing a solid electrolytic capacitor according to claim 8, wherein the solution which contains the conductive polymer and the less conductive polymer also contains at least a water solvent.

10. A method of producing a solid electrolytic capacitor according to claim 9, wherein the oxidizing solution for polymerizing a conductive polymer which is used for forming the solid electrolyte made of the conductive polymer is equal to the oxidizing solution for polymerizing a conductive polymer having one of a ferric salt of aliphatic and aromatic sulfonic acid dissolved in an alcohol solvent, wherein the weight ratio of bivalent iron to trivalent iron is not higher than 0.02 and the molar ratio of aliphatic and/or aromatic sulfonic acid to trivalent iron ranges from 3.0 to 3.5 while the heterocyclic monomer is equal to the heterocyclic monomer which contains at least one of: an impurity of remaining basic organic solvent consisting mainly of not higher than 0.8% of N,N-dimethyl-acetoamide, and polymerized ethylene-dioxythiophene.

11. A method of producing a solid electrolytic capacitor according to claim 8, wherein the oxidizing solution for polymerizing a conductive polymer which is used for forming the solid electrolyte made of the conductive polymer is equal to the oxidizing solution for polymerizing a conductive polymer having one of a ferric salt of aliphatic and aromatic sulfonic acid dissolved in an alcohol solvent, wherein the weight ratio of bivalent iron to trivalent iron is not higher than 0.02 and the molar ratio of the aliphatic and/or aromatic sulfonic acid to trivalent iron ranges from 3.0 to 3.5 while the heterocyclic monomer is equal to the heterocyclic monomer which contains at least one of: an impurity of remaining basic organic solvent consisting mainly of not higher than 0.8% of N,N-dimethyl-acetoamide, and polymerized ethylene-dioxythiophene.

* * * * *